US012602220B2

(12) United States Patent  
Inoue

(10) Patent No.: US 12,602,220 B2  
(45) Date of Patent: Apr. 14, 2026

(54) PROGRAM UPDATE METHOD, PROGRAM UPDATE SYSTEM AND MOBILE OBJECT

(71) Applicant: HONDA MOTOR CO., LTD., Tokyo (JP)

(72) Inventor: Genta Inoue, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 341 days.

(21) Appl. No.: 18/539,785

(22) Filed: Dec. 14, 2023

(65) Prior Publication Data

US 2025/0199792 A1 Jun. 19, 2025

(51) Int. Cl.
| | |
|---|---|
| *G06F 8/65* | (2018.01) |
| *B60W 50/06* | (2006.01) |
| *G06F 9/445* | (2018.01) |
| *G06F 19/00* | (2018.01) |
| *H04L 67/00* | (2022.01) |
| *H04L 67/55* | (2022.01) |

(52) U.S. Cl.  
CPC ............... *G06F 8/65* (2013.01); *H04L 67/55* (2022.05)

(58) Field of Classification Search  
CPC .......... G06F 8/65; G06F 21/572; G06F 8/654; G06F 8/71; G06F 8/66; G06F 8/656; G06F 9/445; G06F 9/4401; H04L 67/55; H04L 67/34; H04L 67/12; G07C 3/14; G07C 5/008; H04W 4/40; H04W 24/02; H04W 84/18; H04W 4/50  
See application file for complete search history.

(56) References Cited

U.S. PATENT DOCUMENTS

| | | | |
|---|---|---|---|
| 7,366,589 B2 * | 4/2008 | Habermas | ................. G06F 8/65 |
| | | | 701/1 |
| 10,324,703 B2 | 6/2019 | Choi | |
| 10,567,550 B2 | 2/2020 | Nordbruch | |
| 10,599,418 B2 | 3/2020 | Kiyama et al. | |
| 10,908,890 B2 | 2/2021 | Nakamura et al. | |
| 11,449,334 B2 | 9/2022 | Noguchi et al. | |
| 11,829,748 B1 * | 11/2023 | Sharma | ................... H04W 4/80 |

(Continued)

FOREIGN PATENT DOCUMENTS

| | | |
|---|---|---|
| CN | 110865841 A | 3/2020 |
| JP | 4976215 B2 | 7/2012 |

(Continued)

*Primary Examiner* — Thuy Dao  
(74) *Attorney, Agent, or Firm* — WHDA, LLP

(57) ABSTRACT

A program update method of a mobile object by acquiring new program from a server device via a network, comprises: performing update of a program of an electronic control unit equipped with the mobile object while the mobile object is stationary by using the new program acquired from the server device; sending, by using a short range communication from the mobile object to the mobile terminal, a second information regarding update of the program of the electronic control unit to the mobile terminal while the mobile object is stationary; and notifying to a user of the finish of the program update before movement of the mobile object is started by at least one of the mobile terminal or a notification device equipped with the mobile object, wherein the notification to the user by the mobile terminal is not made at least during the movement of the mobile object.

20 Claims, 26 Drawing Sheets

(56)                  References Cited

U.S. PATENT DOCUMENTS

| | | |
|---|---|---|
| 2016/0266886 A1 | 9/2016 | Sarkar et al. |
| 2022/0107798 A1 | 4/2022 | Takatsuna |

FOREIGN PATENT DOCUMENTS

| | | |
|---|---|---|
| JP | 6440643 B2 | 12/2018 |
| JP | 2019-191943 A | 10/2019 |
| JP | 6737731 B2 | 8/2020 |
| WO | 2023/007577 A1 | 2/2023 |

* cited by examiner

1000

10

SERVER

200

20

22

VERSION

SCHEDULE UPDATE
PERFORM UPDATE
REPORT UPDATE
DISPLAY RESULT

30

SCHEDULE UPDATE
RECEIVE AND
DISPLAY RESULT

| VIN | UPDATE ID | VERSION | STATUS | RESULT | FEATURE | REPORT2 |
|---|---|---|---|---|---|---|
| | 2023001 | 2.4.5 | UPDATED | S | | 1 |
| | 20230002 | 2.1.8 | SCHEDULED (TIME XXXXX) | 0 | | 0 |

*FIG. 10*

| UPDATE ID | VERSION | STATUS | RESULT | FEATURE | REPORT1 | REPORT2 |
|---|---|---|---|---|---|---|
| 2023001 | 2.4.5 | UPDATED | S | | 1 | 1 |
| 20230002 | 2.1.8 | SCHEDULED (TIME XXXXX) | 0 | | 0 | 0 |

*FIG. 11*

| UPDATE ID | VERSION | STATUS | RESULT | FEATURE | NOTIFY |
|---|---|---|---|---|---|
| 2023001 | 2.4.5 | UPDATED | S | | 1 |

*FIG. 14*

PROGRAM UPDATE METHOD, PROGRAM UPDATE SYSTEM AND MOBILE OBJECT

BACKGROUND

Technical Field

The present disclosure relates to a program update method, program update system and mobile object.

Related Art

An Electronic Control Unit (ECU) which is equipped with a mobile object such as a vehicle provides various functions implemented by executing a software program. The software program is updated by a program update system.

SUMMARY

In one aspect of the present disclosure, a program update method of a mobile object by acquiring new program from a server device via a network comprises:

(i) performing update of a program of an electronic control unit equipped with the mobile object while the mobile object is stationary by using the new program acquired from the server device;

(ii) sending, from the mobile object to a mobile terminal via a mobile communication network, a first information regarding update of the program of an electronic control unit while the vehicle is stationary;

(iii) sending, by using a short range communication from the mobile object to the mobile terminal, a second information regarding update of the program of the electronic control unit to the mobile terminal while the mobile object is stationary; and (iv) notifying to a user of the finish of the program update before movement of the mobile object is started by at least one of the mobile terminal or a notification device equipped with the mobile object, wherein the notification to the user by the mobile terminal is not made at least during the movement of the mobile object.

BRIEF DESCRIPTION OF THE DRAWINGS

The advantages of the disclosure will become apparent in the following description taken in conjunction with the following drawings.

FIG. 10 is an example of a table which shows data structure stored in the server 10.

FIG. 11 is an example of a table which shows data structure stored in the vehicle 20.

FIG. 14 is an example of a table which shows data structure stored in the mobile terminal 30.

DESCRIPTION OF EXEMPLARY EMBODIMENTS

Figure 1:
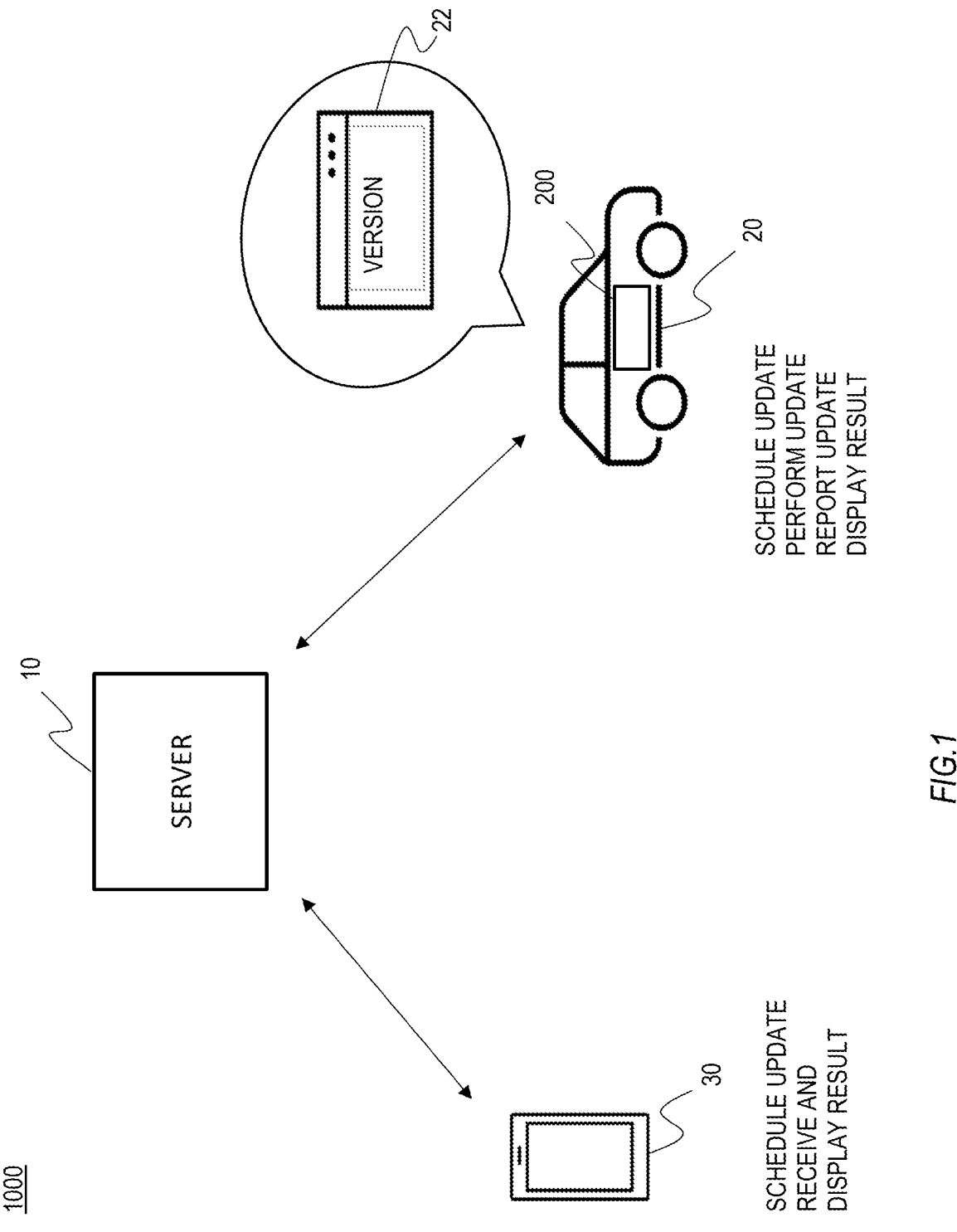
FIG. 1 schematically describe an update system 1000 according to one embodiment.

Hereinafter, the present disclosure will be described through embodiments, but the following embodiments do not limit the invention according to the claims. In addition, not all combinations of features described in the embodiments are essential to the solution of the invention.

FIGS. 1-4 schematically describe an update system 1000 according to one embodiment and also describe update of a program. The update system 1000 includes a server 10, a vehicle 20, and a mobile terminal 30. The vehicle 20 communicates with the server 10 via a communication network. The server 10 also communicates with the mobile terminal 30 via the communication network. The communication network includes an IP network such as the Internet, a P2P network, a dedicated line including a VPN, a virtual network, a mobile communication network, and the like.

The vehicle 20 includes a control system 200. The control system 200 is responsible for control of the vehicle 20 and communication with the server 10 via the communication network. In the vehicle 20, the control system 200 includes a plurality of ECUs (Electronic Control Units) configured to perform control of the vehicle 20. The control system 200 is configured to acquire an update program of the ECU provided to the control system 200 from the server 10. For example, the control system 200 is configured to receive an update program, which is transmitted from the server 10, via the communication network by wireless communication such as a mobile communication network. For example, download of a new update program from the server 10 to the vehicle 20 is performed during the vehicle 20 is moving. The control system 200 is configured to reprogram the ECU provided to the control system 200 by rewriting a program, which is executed by the ECU provided to the control system 200, with the update program. Such reprogramming is performed for upgrade and the like of functions of the ECU provided to the control system 200. In this way, the control system 200 is configured to update the ECU by reprogramming the ECU by OTA (Over The Air). In the present embodiment, rewriting a program, which is executed by a device such as the ECU, by the update program is referred to as 'program update'.

For safety purpose, the program update is performed when the vehicle 20 is parked and in stationary state. During the program update, the vehicle 20 cannot be driven nor used. Also, the program update takes time, and a user cannot use the vehicle for a while. Therefore, the user is allowed to schedule an initiation time of the program update at convenient time, for example, during nighttime when the vehicle 20 is parked. As described by FIG. 1, the scheduling of the initiation time of the program update may be done by using the mobile terminal 30. Also, the scheduling of the initiation time may be done by using an interface device 22 such as HMI equipped with the vehicle 20. At the scheduled initiation time, the control system 200 of the vehicle 20 performs the program update, and after finishing the program update, the control system 200 reports the result of the update to the server 10 via the communication network. The server 10 updates its internal record and sends information regarding the update of the program to the mobile terminal 30 via the communication network such that the mobile terminal 30 may display the information regarding the update of the program to notify the user. The control system 200 of the vehicle 20 may also display the information regarding the update of the program on the interface device 12 to notify the user. The information regarding the update of the program includes a result (completion or failure of the update process), version of the new program and details of new feature of the new program.

Figure 2:
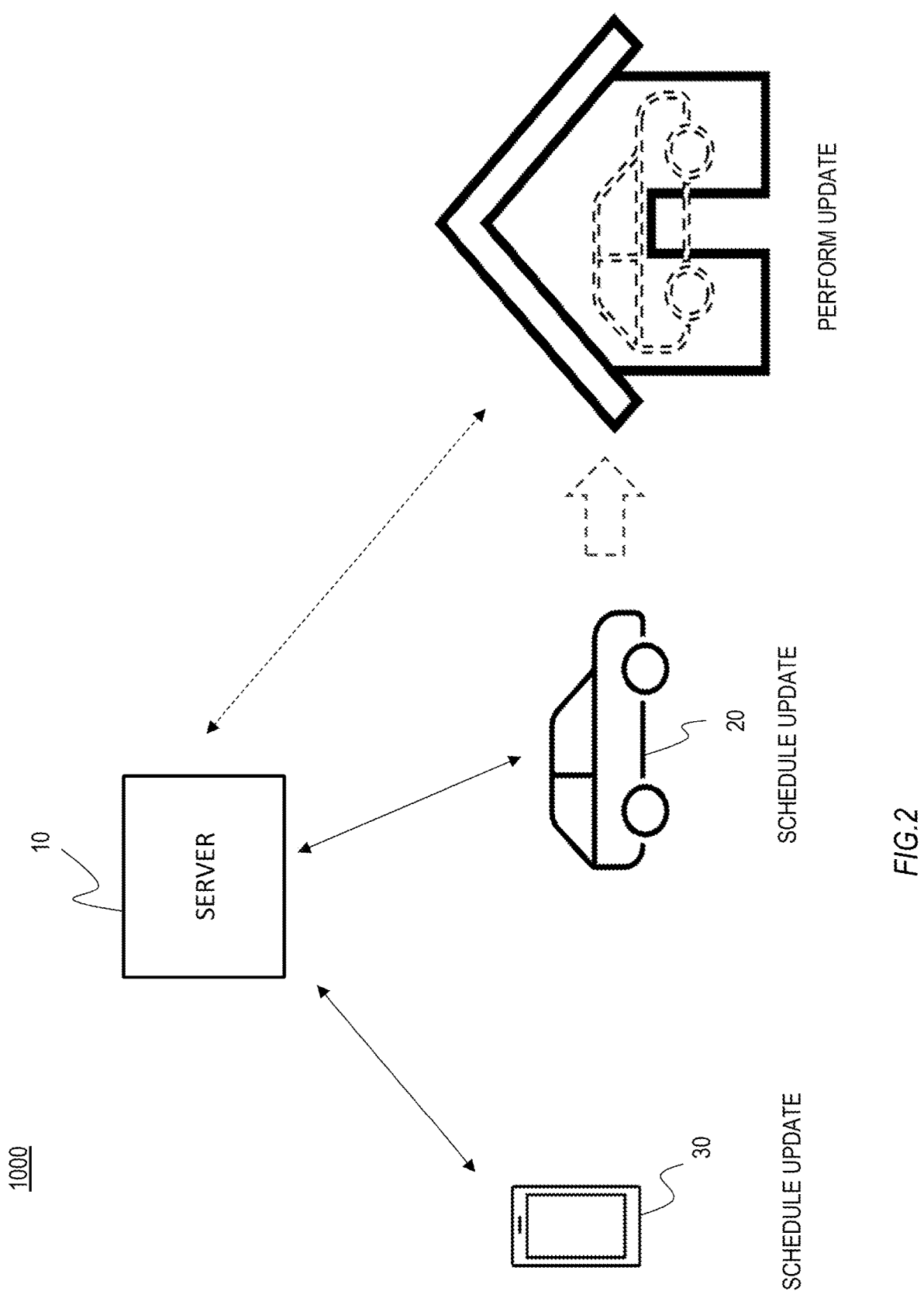
FIG. 2 schematically describe an update system 1000 according to one embodiment.

As described by FIG. 2, a situation may occur in which after the scheduling of the initiation time of the program update, the vehicle 20 is parked inside an underground garage of a building where the communication network such as a mobile communication network is not available because electromagnetic wave is too weak. At the scheduled initiation time, the control system 200 of the vehicle 20 performs the program update. However, because the communication network is not available, the control system 200 may not report the result of the update to the server 10 via the communication network. As a result, the mobile terminal 30 may not receive information regarding the update of the program.

Figure 3:
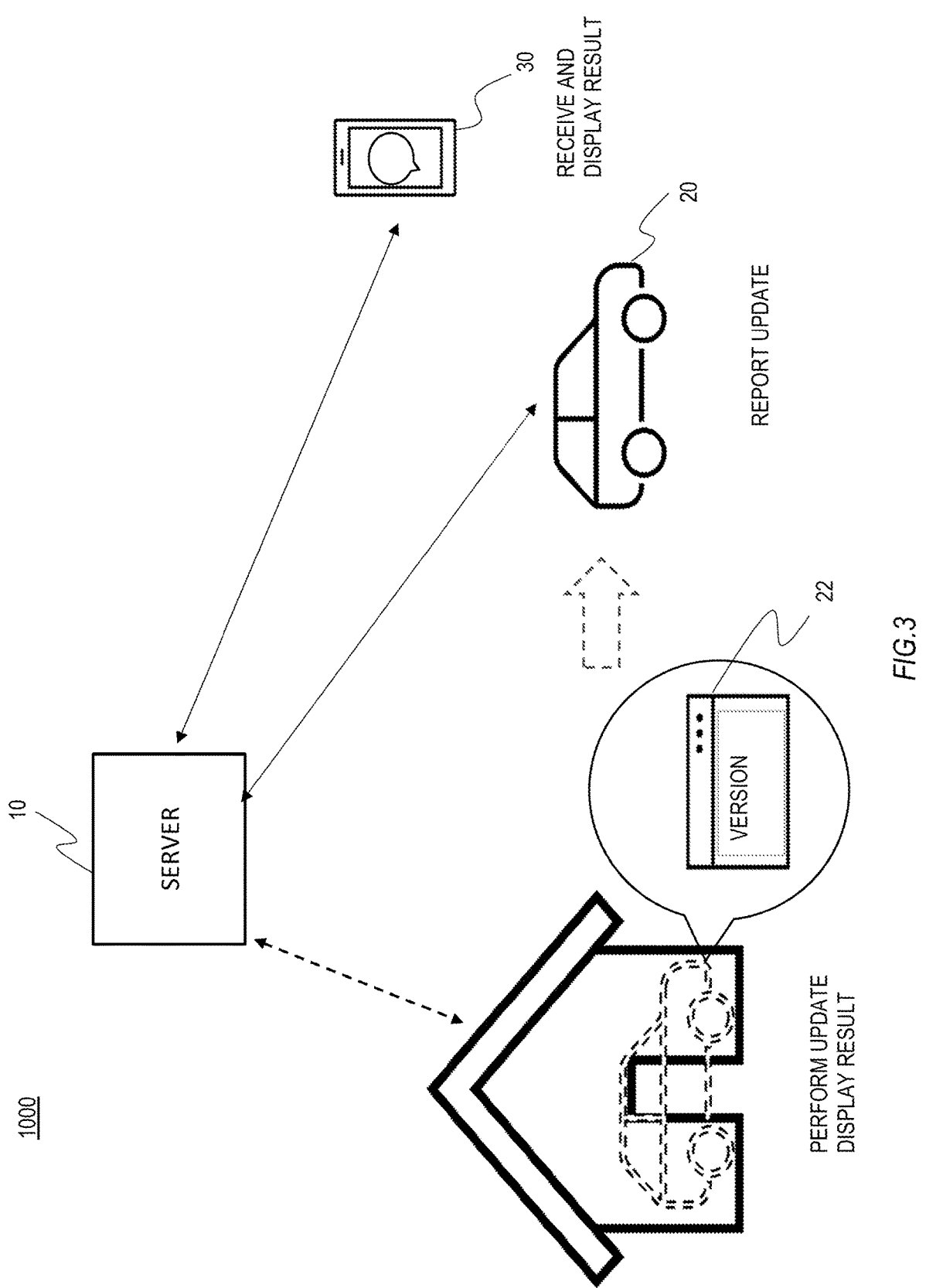
FIG. 3 schematically describe an update system 1000 according to one embodiment.
Figure 4:
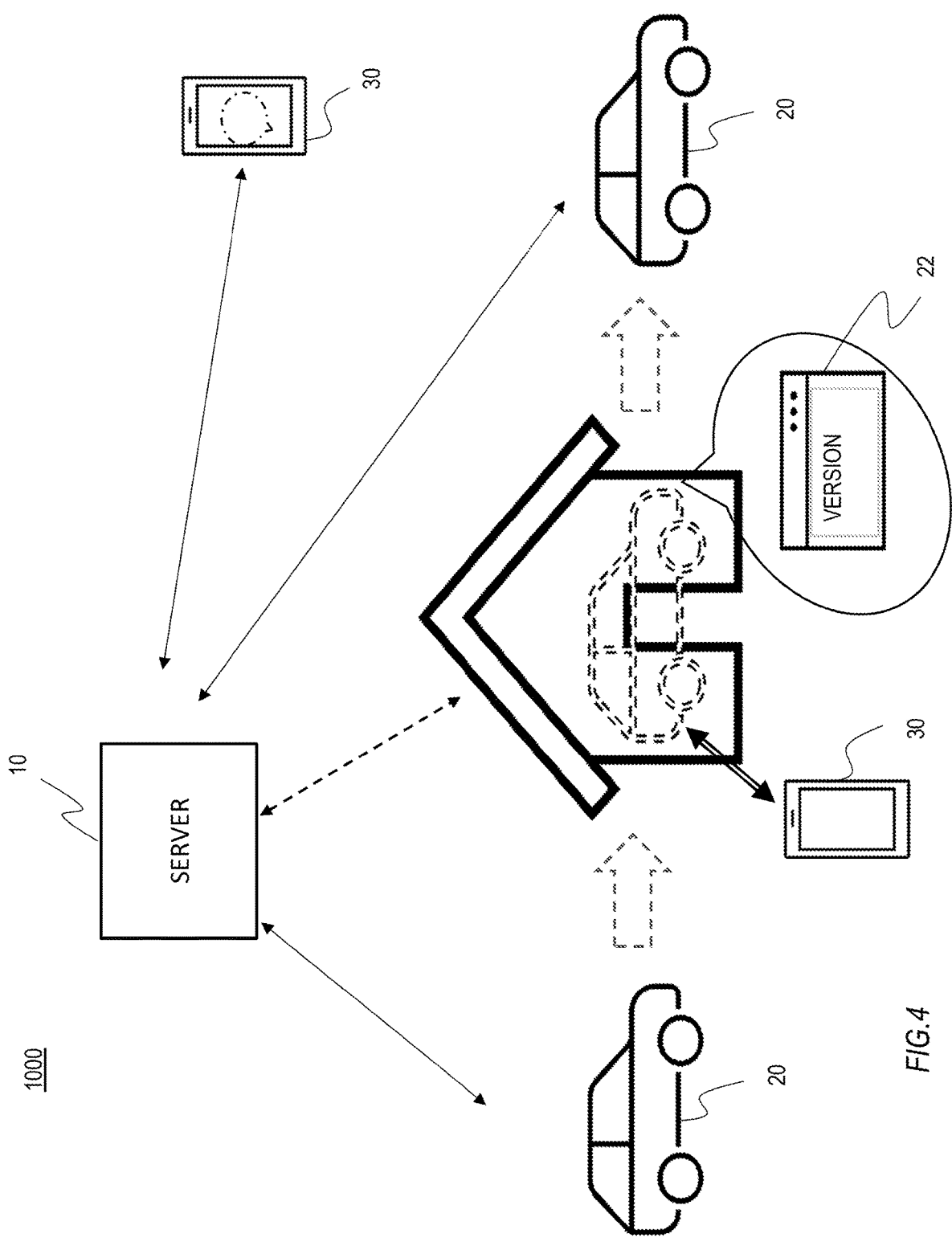
FIG. 4 schematically describe an update system 1000 according to one embodiment.

As described by FIG. 3, after the program update has been performed, the user unlocks a door of the vehicle 20 and enters the vehicle 20. In this situation, the control system 200 of the vehicle 20 displays the information regarding the update of the program on the interface device 22 such that the user is enabled to confirm the result of the program update (completion or failure of the update process), version of the new program and details of new feature of the new program. Then, the user starts driving the vehicle 20 and the vehicle 20 is moved from the building to a location where the communication network is available. The control system 200 confirms the availability of the communication network and reports the result of the update to the server 10 via the communication network. The server 10 updates its internal record and sends information regarding the update of the program to the mobile terminal 30 via the communication network. As a result, the mobile terminal 30 again displays the information regarding the update of the program. Depending on circumstance, there may be substantial time lag between the first displaying by the HMI 22 and the second displaying by the mobile terminal 30. Thus, there is a possibility that the user may be confused whether the second displaying of the update of the program is the same information as the first displaying, or different and newer information regarding newer update.

It would be preferable to prevent such confusion occurring to a user by repetitive displaying of the same information. For example, as described by FIG. 4, the control system 200 of the vehicle 20 may communicate with the mobile terminal 30 by using a short range communication. In this configuration, after finishing the program update, the control system 200 sends information regarding the update of the program to the mobile terminal 30 via the short range communication. The short range communication includes wired communication such as USB, USB-C® and Thunderbolt® and wireless communication such as Bluetooth®, Wi-Fi®, NearLink, near-field communication (NFC), LPWAN, ultra-wideband (UWB). For example, the user approaches the vehicle 20 with carrying the mobile terminal 30. When the user is present within the range of wireless communication by the short range communication, the short range communication becomes available. The control system 200 detects the availability of the short range communication and sends the information regarding the update of the program to the mobile terminal 30 via the short range communication.

For example, when receiving the information regarding the update of the program, the mobile terminal 30 may display the information regarding the update of the program thereon to notify the user when the vehicle 20 is in a stationary state before the vehicle 20 starts moving by driving of a user. In this sense, as long as the notification by the mobile terminal 30 is performed when the vehicle 20 is in a stationary state and before the vehicle 20 starts moving by driving of a user, the notification by the mobile terminal 30 may be performed before or after the HMI 22 displays the information regarding the update of the program. Also, the notification by the mobile terminal 30 and the notification by the HMI 22 may be done simultaneously. By such a configuration, even if the vehicle 20 is parked in a place where the communication network such as a mobile communication network is not available, it is possible for the mobile terminal 30 to receive the information regarding the update of the program from the vehicle 20 after finishing the program update. Thus, it is possible to prevent substantial delay in the notification by the mobile terminal 30 after the notification by the HMI 22, and it is possible to prevent possible confusion to a user by delayed repetitive notification.

For example, by using the information regarding the update of the program received from the vehicle 20, the mobile terminal 30 may be suppressed from repetitively displaying the information regarding the update of the program with substantial delay time after the notification by the HMI 22. For example, as described by FIG. 4, the mobile terminal 30 receives the information regarding the update of the program from the vehicle 20 via the short range communication. Then, the mobile terminal 30 stores the received information regarding the update of the program. Then, the mobile terminal 30 may or may not display the information regarding the update of the program at this stage before the vehicle 20 is started moving. After the user moves the vehicle 20 to the outside of the garage, the communication network becomes available. The control system 200 reports the result of the update to the server 10 via the communication network. The server 10 updates its internal record and sends the information regarding the update of the program to the mobile terminal 30 via the communication network.

When receiving the information regarding the update of the program from the server 10 via the communication network, the mobile terminal 30 compares the received information regarding the update of the program with the stored information regarding the update of the program. When the two information are regarding the same update of the program, the mobile terminal 30 ignores the received information regarding the update of the program. On the other hand, when the two information are regarding different updates of the program, the mobile terminal 30 may display the received information regarding the update of the program. By such a configuration, even if the vehicle 20 is parked in a place where the communication network such as a mobile communication network is not available, it is possible for the mobile terminal 30 to receive the information regarding the update of the program from the vehicle 20 after finishing the program update. Also, by using the information received via the short range communication, it is possible to prevent repetitive notification with substantial delay by the mobile terminal 30 after the notification by the HMI 22, and it is possible to prevent possible confusion to a user by delayed repetitive notification.

The vehicle 20 is an example of a mobile object. The mobile object of the present embodiment can be a mobile object which includes an ECU which can be updated by reprogramming the ECU by OTA (Over The Air). The mobile object may include a vehicle, a watercraft, and an aircraft. For example, the vehicle 20 may be a vehicle with an internal combustion engine, an electric vehicle such as a Battery Electric Vehicle (BEV), a Hybrid Electric Vehicle (HEV), a Plug-in Hybrid Electric Vehicle (PHEV), an Extended Range Electric Vehicle (EREV).

Figure 5:
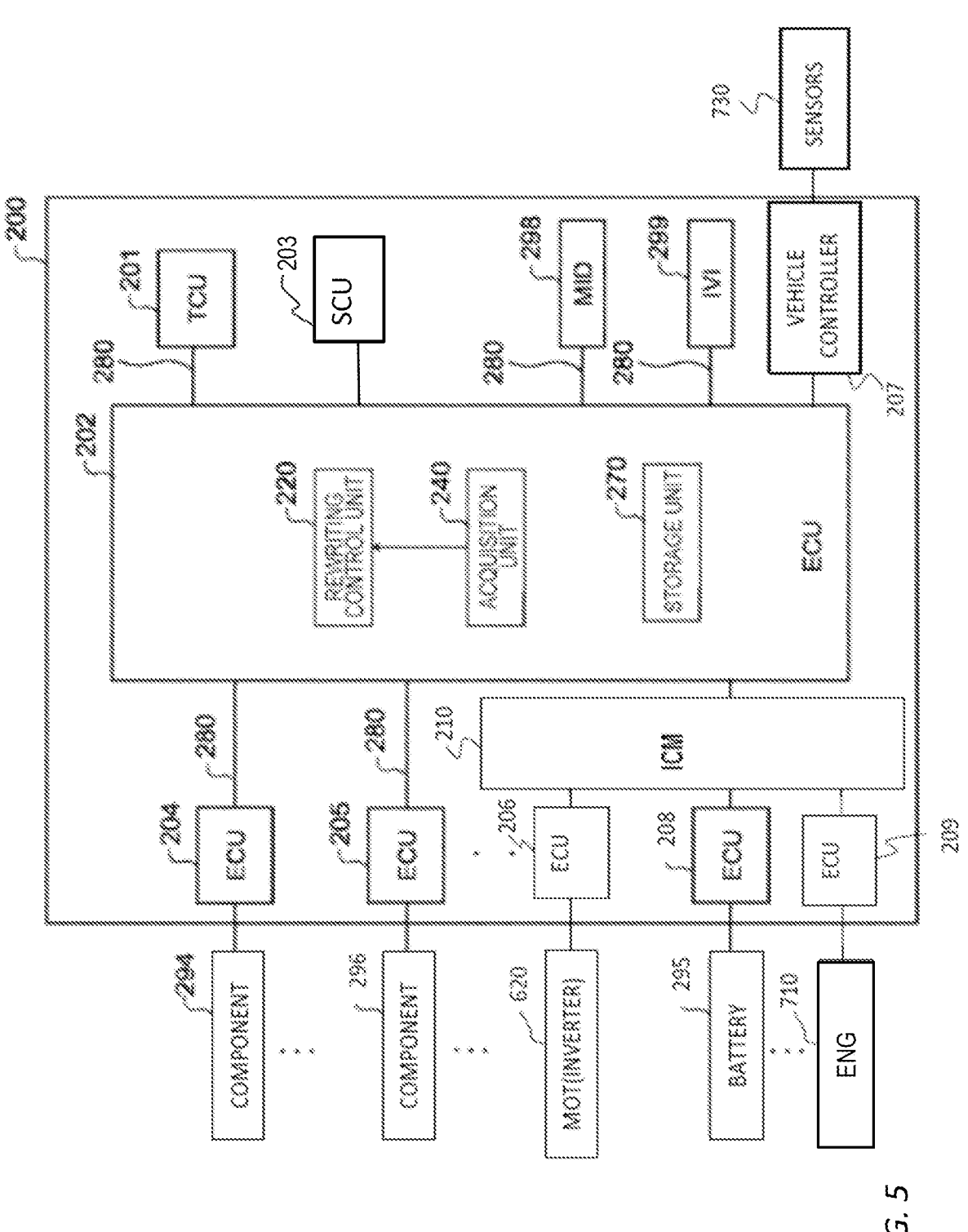
FIG. 5 schematically shows a system configuration provided to the control system 200, together with a to-be-controlled device.

FIG. 5 schematically shows a system configuration provided to the control system 200, together with a to-be-controlled device. The control system 200 has a TCU 201, a SCU 203, an ECU 202, an ECU 204, an ECU 205, an ECU 206, an ECU 208, an ECU 209, an MID 298, an IVI 299, and an Intelligent Control Module (ICM) 210. The ICM 210 is a control unit which manages and controls a vehicle drive system such as an electric drive motor 620, a battery 295 and an internal combustion engine 710.

The ECU 202 is connected to the TCU 201, the SCU 203, the ECU 204, the ECU 205 and the ICM 210 as well as a vehicle controller 207 via an in-vehicle communication line 280. The ECU 202 is configured to mutually communicate with the TCU 201, the SCU 203, the ECU 204, the ECU 205, the ICM 210, the MID 298, the vehicle controller 207 and the IVI 299 via the in-vehicle communication line 280. The ECU 202 is configured to collectively control the TCU 201, the SCU 203, the ECU 204, the ECU 205, the ICM 210, the MID 298 and the IVI 299. The in-vehicle communication line 280 may be configured to include a CAN (Controller Area Network), an Ether Network and the like, for example. The ECU 202 is also configured to control the ECU 206, the ECU 208, and the ECU 209 via the ICM 210.

The TCU 201 is a telematics control unit. The TCU 201 is mainly responsible for mobile communication. The TCU 201 is configured to transmit and receive data to and from the external server 10, based on control of the ECU 202. The TCU 201 is configured to receive the update program transmitted from the server 10 by mobile communication, based on control of the ECU 202. The TCU 201 can function as a wireless communication unit.

The SCU 203 is a short range communication unit. The SCU 203 is mainly responsible for short range communication. The SCU 203 is configured to transmit and receive data to and from the mobile terminal 30, based on control of the ECU 202. The SCU 203 is configured to communicate with the mobile terminal 30 via short range communication such as Bluetooth®, Wi-Fi®, NearLink, near-field communication (NFC), LPWAN, ultra-wideband (UWB), based on control of the ECU 202. The SCU 203 may also be configured to communicate with the mobile terminal 30 via wired communication such as USB, USB-C® and Thunderbolt®.

The MID 298 is a multi-information display. The IVI 299 is, for example, an in-vehicle infotainment information device (IVI). The MID 298 and the IVI 299 can function as a display control unit. The IVI 299 has a wireless LAN communication function. The IVI 299 is configured to receive the update program transmitted from the server 10 by wireless LAN communication, based on control of the ECU 202. The MID 298 and the IVI 299 can be a part of HMI (Human Machine Interface) 22. The ECU 202 communicates with the vehicle controller 207 to receive detection information such as door-lock/unlock and IG on/off detected by sensors 730 such as a door lock sensor and an IG on/off sensor.

The ECU 204, the ECU 205, the ECU 206, the ECU 208 and the ECU 209 are each an ECU as a vehicle control unit configured to control at least a part of the vehicle 20. The ECU 204, the ECU 205, the ECU 206, the ECU 208 and the ECU 209 are examples of the 'mobile object control unit'. The ECU 204, the ECU 205, the ECU 206, the ECU 208 and the ECU 209 are configured to control a variety of devices provided to the vehicle 20. ECU 204 and ECU 205 are the first electronic control unit which is not related to a control of a component of the mobile object which is a part of the high-voltage power system. For example, the ECU 204 is configured to control a component such as a power window 294, and the like. The ECU 205 is configured to control a component such as an automatic light 296, and the like.

ECU 206 and ICM 210 are the second electronic control unit which controls a component of the mobile object which is a part of the high-voltage power system. For example, the ECU 206 is configured to control the electric motor 620, and the like. Next, the ECU 208 is configured to control a battery 295, and the like. The battery 295 is a high-voltage battery which functions as a power supply for driving a power source such as an electric motor of a vehicle, for example. The battery 295 is, for example, a lithium-ion battery or the like. The ECU 209 is configured to control the internal combustion engine (ICE) 710, and the like. The electric motor 620, the battery 295 and the ICE 710 are examples of components of a vehicle drive system which is managed and controlled by the ICM 210. Note that, in FIG. 5, the power window 294, the automatic light 296, the battery 295, the ICE 710 and the electric motor 620 are examples of the to-be-controlled device provided to the vehicle 20, and the vehicle 20 may have a to-be-controlled device other than the devices shown in FIG. 5.

In the present embodiment, the system configuration where the control system 200 includes the TCU 201, the SCU 203, the ECU 202, the ECU 204, the ECU 205, the ECU 206, the ECU 208. The ECU 209, the ICM 210, the MID 298 and the IVI 299 is exemplified. However, the system configuration of the control system 200 is not limited to the example of the present embodiment. In addition, in the present embodiment, as an example, it is described that the mobile object control unit that may be a target of the program update is the ECU 204, the ECU 205, the ECU 206, the CIM 210, and the ECU 202 functions as a 'program update control apparatus' configured to control the program update. Note that, the mobile object control unit that may be a target of the program update is not limited to these ECUs. The mobile object control unit that may be a target of the program update may be any of the TCU 201, SCU 203, the ECU 202, the ECU 204, the ECU 205, the ECU 206, the ECU 208, the ECU 209, the ICM 210, the MID 298 and the IVI 299.

The ECU 202 is configured to function as a program update control apparatus configured to control the program update of the ECU. The ECU 202 includes a rewriting control unit 220, an acquisition unit 240, and a storage unit 270.

The rewriting control unit 220 is configured to perform control of rewriting a program, which is executed by the ECU configured to control at least a part of the vehicle 20, to a new program. The acquisition unit 240 is configured to acquire a new program from the server 10.

Figure 6:
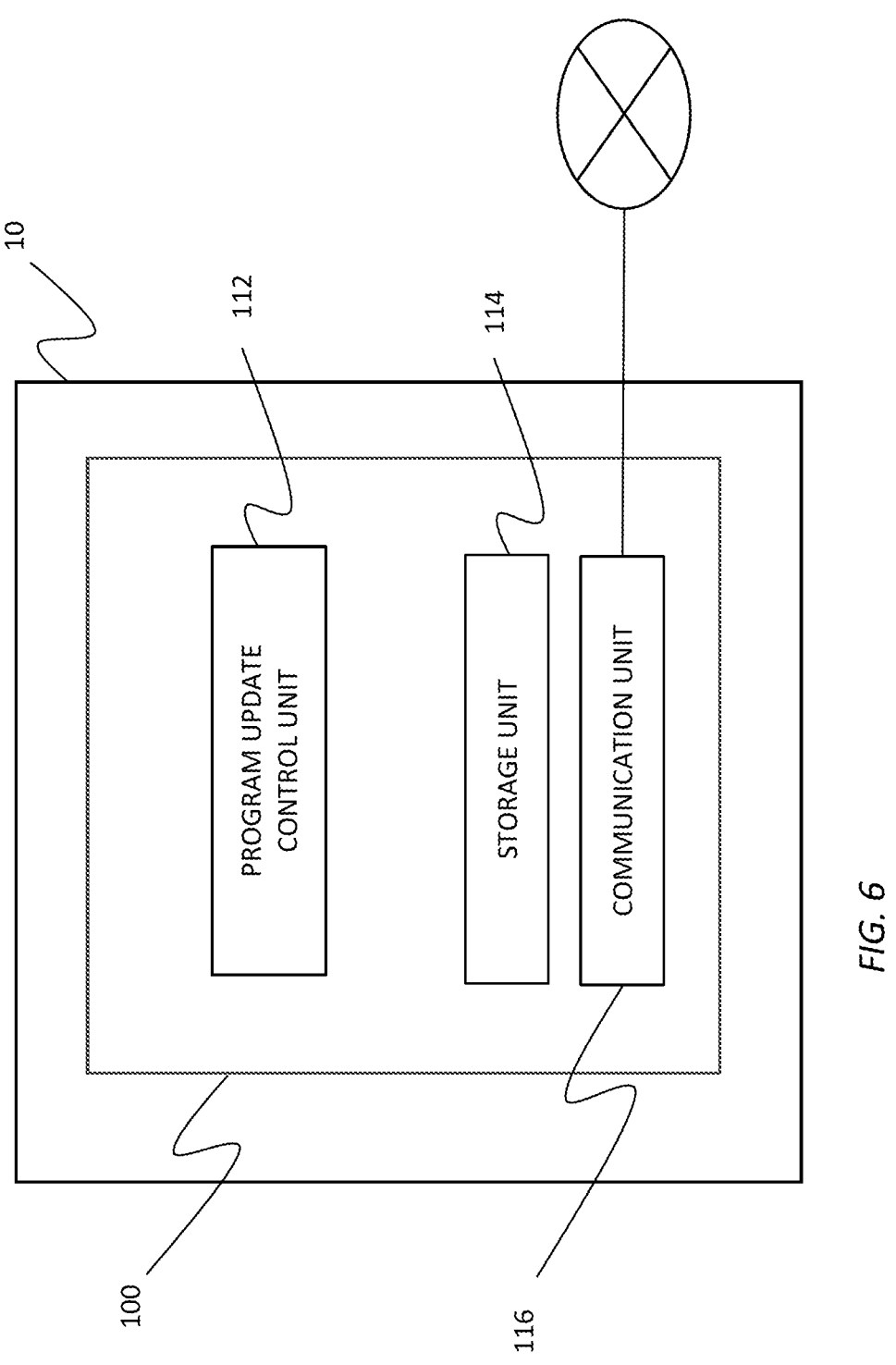
FIG. 6 schematically shows a configuration of the server 10.

FIG. 6 schematically shows a configuration of the server 10. The server 10 includes a control system 100. The control system 100 is responsible for control of the server 10 and communication with the vehicle 20 and the mobile terminal 30 via the communication network such as a mobile communication network through the communication unit 116 such as a network card. The control system 100 includes a program update control unit and a storage unit 114.

The program update control unit 112 maintains current version of program for each vehicle registered in the server 10 by timely updating a program for each ECU. The program update control unit 112 sends and receives information and data to and from the vehicle 20 and the mobile terminal 30 through the communication unit 116, and save and maintain data stored in the storage unit 114.

Figure 7:
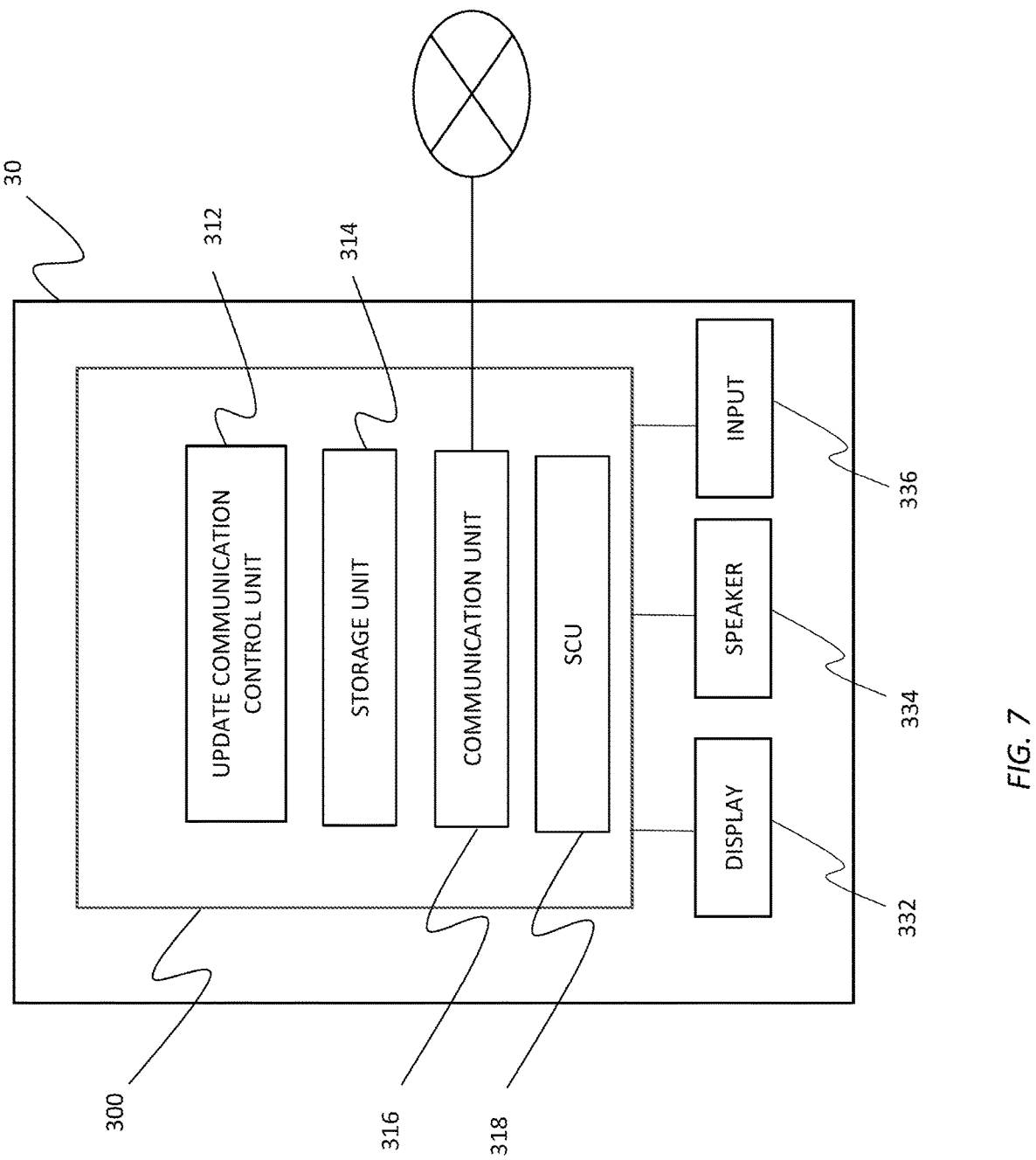
FIG. 7 schematically shows a configuration of the mobile terminal 30.

FIG. 7 schematically shows a configuration of the mobile terminal 30. The mobile terminal 30 includes a control system 300. The control system 300 is responsible for control of the mobile terminal 300 and communication with the server 10 via the communication network such as a mobile communication network through the communication unit 316 such as a network card. The control system 300 is also communication with the vehicle 20 through the short range communication unit (SCU) 318 via short range communication such as Bluetooth®. The control system 300 includes an update communication control unit 312 and a storage unit 314. The control system 300 also controls an output device of the mobile terminal 30 such as a display device 332 and a speaker 334 to output information, and also control an input device 336 such as a keyboard and a touch panel to receive input information from a user.

When a new version of a program is released, the program update control unit 112 of the server 10 stores it and identifies a vehicle which is subject to update based on the new version of the program by checking the current version of program for respective vehicles. When the subject vehicle is identified, the program update control unit 112 communicates with the vehicle 20 which is subject to the update and causes the vehicle 20 to download and save the new program thereon to update the program by rewriting the program for an ECU. Before starting the download, the program update control unit 112 may obtain an approval for the download from a user of the subject vehicle. For example, the program update control unit 112 sends information such as version information and detailed feature or improvement of the new program to the vehicle 20. The rewriting control unit 220 displays version information and detailed feature or improvement of the new program on the IVI 299 and/or MID 298, and prompts approval by a user. The program update control unit 112 may also send the information such as version information and detailed feature or improvement of the new program to the mobile terminal 30. The update communication control unit 312 displays version information and detailed feature or improvement of the new program on the display device 332, prompts approval by a user to be input via the input device 336.

Figure 8:
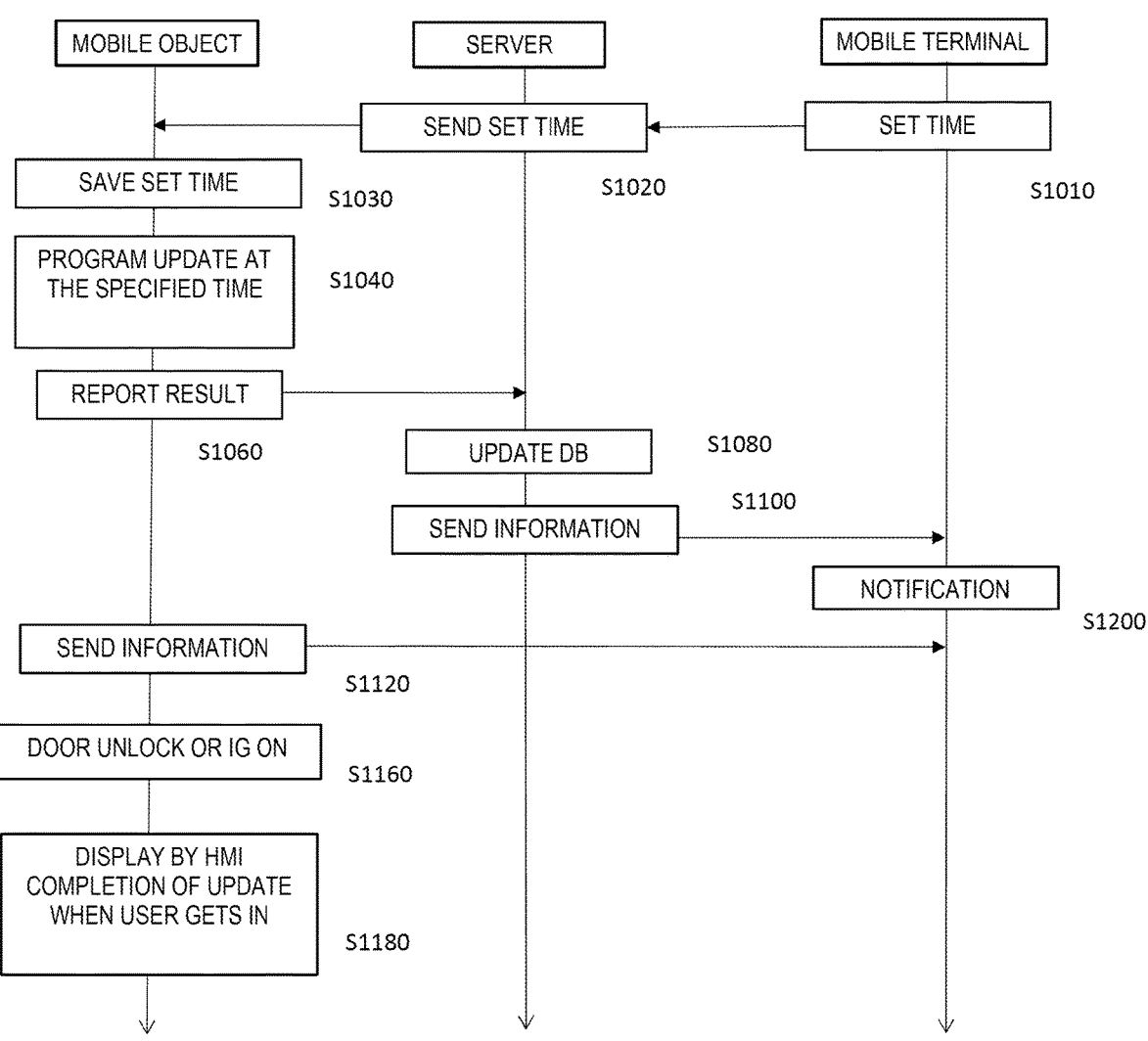
FIG. 8 shows a processing of a program update method of a mobile object according to one embodiment of the present application.
Figure 9:
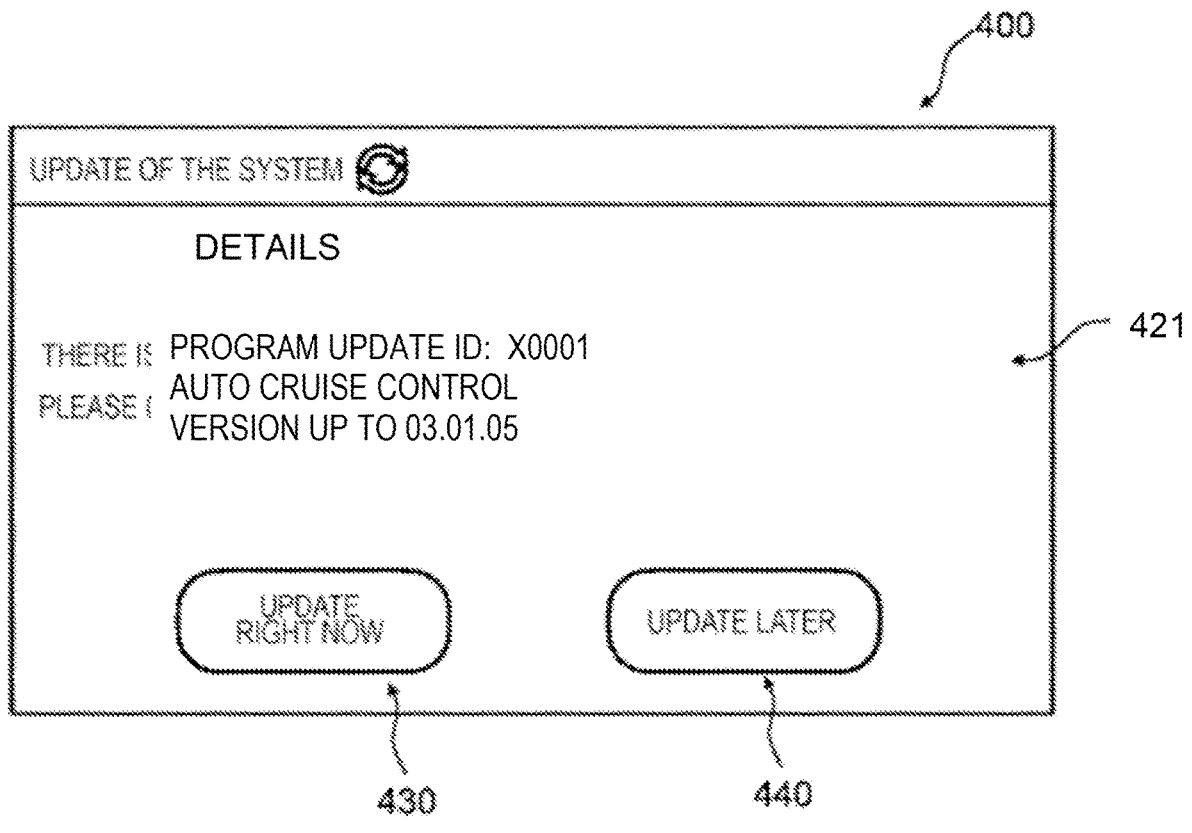
FIG. 9 shows an example of a set time acquisition screen 400.

Now, a processing of a program update method of a mobile object according to one embodiment of the present application is described. FIG. 8 shows a processing of a program update method of a mobile object according to one embodiment of the present application. The processing of FIG. 8 of the present embodiment is performed after the new program has been downloaded to the vehicle 20 from the server 10 via the communication network. At step S1010, the update communication control unit 312 of the mobile terminal 30 acquires a set time when a user of the vehicle 20 desires to initiate the program update. FIG. 9 shows an example of a set time acquisition screen 400. For example, to acquire the user's desired set time, the update communication control unit 312 displays, on the display device 332, the set time acquisition screen 400. The set time acquisition screen 400 includes a detail of program update section 421. The detail of program update section 421 includes detailed information of the program update such as a function to be updated and version number. The set time acquisition screen 400 includes a UI button 430 for acquiring a user's consent to initiate the program update right now, and a UI button 440 for acquiring, from the user, a desired set time to initiate the program update later at the set time. For example, by clicking the UI button 440, the next screen prompts the user to enter or select specific date and time as a set time. The user can enter or select desired date and time by using the input device 336.

When acquiring the set time, the update communication control unit 312 sends the set time to the server 10 by the communication unit 316. At the step 1020, the program update control unit 112 of the server receives the set time and sends (forwards) the set time to the vehicle 20 by the communication unit 116.

At the step 1020, the server 10 may update internal record by using the received set time. FIG. 10 is an example of a table which shows data structure stored in the server 10. As shown by FIG. 10, the table includes a vehicle identification number, a program update ID, a version information, a status indicator, a result of program update, a feature of the program update such as improved function. When the program update control unit 112 receives the set time from the mobile terminal 30, the program update control unit 112 causes the storage unit 114 to update the status (scheduled date and time) for the subject program update indicated by the program update ID by using the received set time.

At step 1030, the vehicle 20 saves the received set time by updating internal record. FIG. 11 is an example of a table which shows data structure stored in the vehicle 20. As shown by FIG. 11, the table includes a program update ID, a version information, a status indicator, a result of program update, a feature of the program update such as improved function. When the rewriting control unit 220 receives the set time from the server 10, the rewriting control unit 220 causes the storage unit 270 to update the status (scheduled date and time) for the subject program update indicated by the program update ID by using the received set time.

In the above embodiment, the user's desired set time is acquired by the mobile terminal 30. However, the embodiment is not limited to this configuration. The vehicle 20 may acquire the user's desired set time directly. For example, the rewriting control unit 220 may display on the IVI 299 and/or MID 298 the set time acquisition screen 400 and acquire the set time input on the IVI 299 and/or MID 298. The rewriting control unit 220 then causes the storage unit 270 to update the status (scheduled date and time) for the subject program update indicated by the program update ID by using the acquired set time. In this embodiment, the rewriting control unit 220 may send the acquired set time to the server 10 such that the server 10 may update internal record by using the received set time.

When the desired set time has been reached at step S1040, the program update is performed by the rewriting control unit 220. The program update is performed when the vehicle 20 is in stationary state and during the IG power supply is off. After performing the program update, the rewriting control unit 220 updates the result in the table of FIG. 11. For example, when the program update is successful, information of "S" is entered in the result of program update. On the other hand, when the program update is failure, information of "F" is entered.

Then, at step S1060, the rewriting control unit 220 sends a report including information regarding update of the program to the server 10 by using the TCU 201 via the communication network such as mobile communication network. As shown by FIG. 11, for example, the table in the vehicle 20 includes a flag "REPORT 1." When an acknowledgement is sent from the server 10 in response to the report, the rewriting control unit 220 may update the flag "REPORT 1" from zero to one to indicate that the report has been received by the server 10.

At step S1080, the program update control unit 112 updates the stored table by using the received information. For example, as shown by FIG. 10, the data entry for the status indicator and the result are updated as "UPDATED" and "S." Then, at step S1100, the program update control unit 112 sends information regarding update of the program to the mobile terminal 30 via the communication unit 116. As shown by FIG. 10, for example, the table in the server 10 includes a flag "REPORT 2." When an acknowledgement is sent from the mobile terminal 30 in response to the information sending, the program update control unit 112 may update the flag "REPORT 2" from zero to one to indicate that the information has been received by the mobile terminal 30.

At step S1120, the rewriting control unit 220 sends information regarding update of the program to the mobile terminal 30 by using the SCU 203 via the short range communication such as Bluetooth®. As shown by FIG. 11, for example, the table in the vehicle 20 includes a flag "REPORT 2." When an acknowledgement is sent from the mobile terminal 30 in response to the information sending, the rewriting control unit 220 may update the flag "REPORT 2" from zero to one to indicate that the information has been received by the mobile terminal 30. The information regarding update of the program sent to the mobile terminal 30 from the server 10 may be the same information as the information regarding update of the program sent to the mobile terminal 30 from the vehicle 20. For example, the information includes the program update ID, the version information, the status of update and the feature. Alternatively, these two information may include different or additional information from each other.

Figure 12:
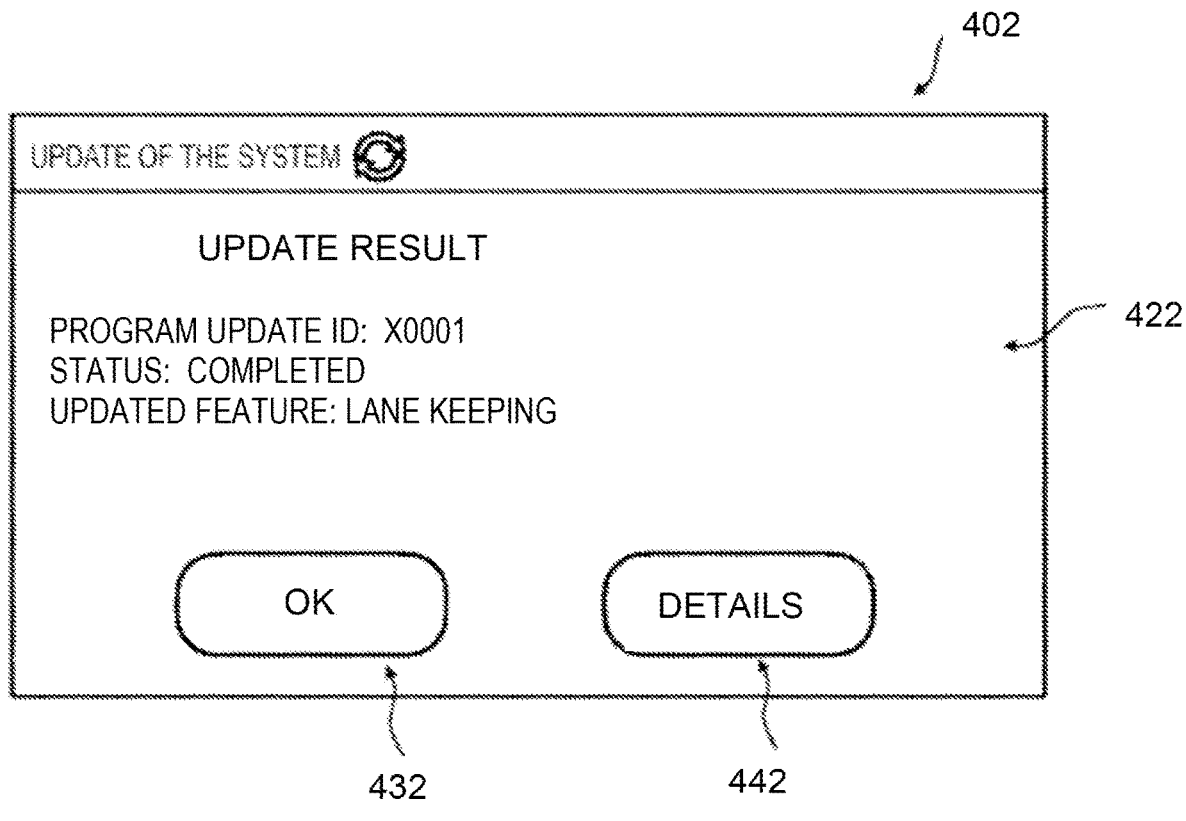
FIG. 12 shows an example of a result of program update screen 40.

At step S1200, the update communication control unit 312 performs notification to a user. For example, the update communication control unit 312 displays on the display device 332, the result of program update screen 402. FIG. 12 shows an example of a result of program update screen 402. The result of program update screen 402 includes message information 422 for a user which includes the result of the program update such as "completed" and updated feature such as "lane keeping." The result of program update screen 402 also includes a UI button 432 for acquiring a user's acceptance of the result and a UI button 442 for changing the screen to the detail of result of program update screen. In the present embodiment, the update communication control unit 312 performs the notification by using the information received from the server 10. However, the embodiment is not limited to this configuration. The step 1200 may occur after the step S1120, and the update communication control unit 312 may perform the notification by using the information received from the server 10, or the information received from the vehicle 20, or both.

At step 1160, the user of the vehicle 20 with carrying the mobile terminal 30 approaches the vehicle 20 which is parked in the underground garage, and a door of the vehicle 20 is unlocked or the IG becomes ON. These events are detected via the sensors 730 and the vehicle controller 207. At step S1180, the rewriting control unit 220 displays information regarding the update of the program on the IVI 299 and/or MID 298 such that the rewriting control unit 220 performs notification to a user. For example, the rewriting control unit 220 displays on the display device 332, the result of program update screen 402.

First Embodiment

Figure 13:
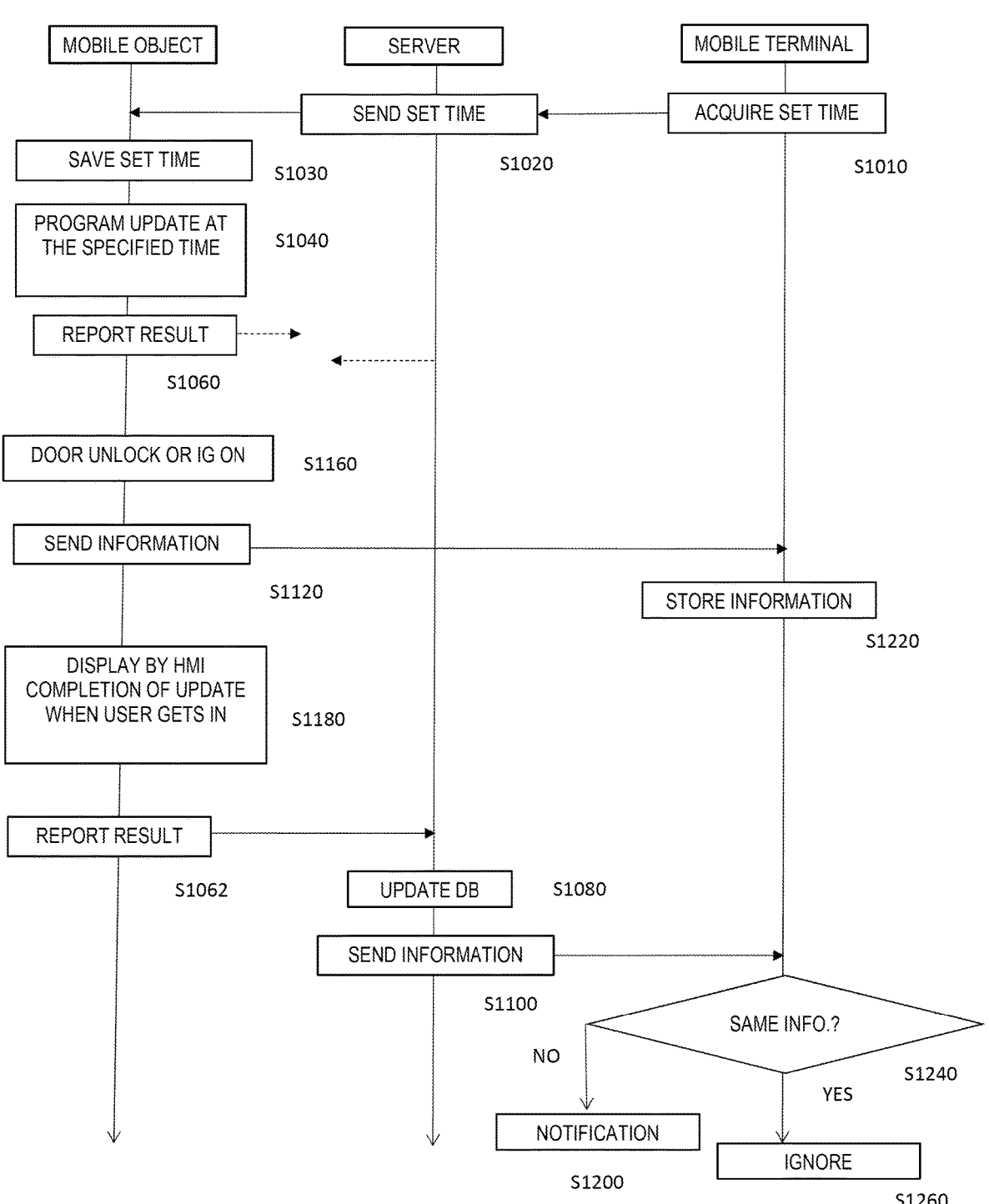
FIG. 13 shows a processing of a program update method of a mobile object according to first embodiment of the present application.

FIG. 13 shows a processing of a program update method of a mobile object according to first embodiment of the present application. Hereinafter, like elements are described by using like reference numerals and repetitive description of like elements employed in one or more embodiments described herein is omitted. The first embodiment is directed to a situation in which the communication network such as a mobile communication network is not available because the vehicle 20 is parked in an underground garage.

After the program update is performed by the rewriting control unit 220 at step S1040, at step S1060, the rewriting control unit 220 sends a report including information regarding update of the program to the server 10 by using the TCU 201 via the communication network such as mobile communication network. In the present embodiment, the vehicle 20 is parked in an underground garage and the communication network is not available. Therefore, the rewriting control unit 220 may not send a report, or the rewriting control unit 220 may not receive acknowledgement from the server 10. In the table of FIG. 11, the report completion flags "REPORT 1" is kept "zero."

At step 1160, the user of the vehicle 20 with carrying the mobile terminal 30 approaches the vehicle 20 which is parked in the underground garage, and a door of the vehicle 20 is unlocked or the IG becomes ON. These events are detected via the sensors 730 and the vehicle controller 207. In such a situation, the short range communication becomes available between the vehicle 20 and the mobile terminal 30.

At step S1120, the rewriting control unit 220 sends information regarding update of the program to the mobile terminal 30 by using the SCU 203 via the short range communication such as Bluetooth®. At step S1220, the update communication control unit 312 stores the received information. FIG. 14 is an example of a table which shows data structure stored in the mobile terminal 30. As shown by FIG. 14, the table includes a program update ID, a version information, a status indicator, a result of program update, a feature of the program update such as improved function.

At step S1180, the rewriting control unit 220 performs notification to the user. The rewriting control unit 220 displays for example the result of program update screen 402 on the IVI 299 and/or MID 298. The result of program update screen 402 includes a UI button 432 for acquiring a user's acceptance of the result.

After accepting the result of the program update, the user is enabled to start moving the vehicle 20. When the vehicle 20 moves to the outside the garage, the communication network becomes available. Then, at step S1062, the rewriting control unit 220 sends a report including information regarding update of the program to the server 10 by using the TCU 201 via the communication network such as mobile communication network. In the present embodiment, the flag "REPORT 1" is kept "zero" up to step S1180. The rewriting control unit 220 can confirm the flag "REPORT 1" to check the status of the receipt of an acknowledgement. If the flag "REPORT 1" is "zero," the rewriting control unit 220 performs sending of the report to the server 10 at step S1062.

At step S1080, the program update control unit 112 updates the stored table by using the received information. For example, as shown by FIG. 10, the data entry for the status indicator and the result are updated as "UPDATED" and "S." Then, at step S1100, the program update control unit 112 sends information regarding update of the program to the mobile terminal 30 via the communication unit 116.

At step S1240, the update communication control unit 312 compares the stored information regarding the update of the program with the received information regarding the update of the program to determine whether these two information are regarding the same program update. For example, this determination may be made by comparing the program update ID of the respective information. When these two information are regarding the same program update, at step S1260, the update communication control unit 312 ignores the received information regarding update of the program from the server 10. When these two information are regarding different program update from each other, at step S1200, the update communication control unit 312 performs notification to a user. For example, the update communication control unit 312 displays on the display device 332, the result of program update screen 402.

By such a configuration, even if the vehicle 20 is parked in a place where the communication network such as a mobile communication network is not available, it is possible for the mobile terminal 30 to receive the information regarding the update of the program from the vehicle 20 after finishing the program update. Also, by using the stored information received via the short range communication for comparison, it is possible to prevent repetitive notification with substantial delay by the mobile terminal 30 after the notification by the HMI 22, and it is possible to prevent possible confusion to a user by delayed repetitive notification. In this embodiment, it is possible to prevent repetitive notification after the vehicle 20 is started moving.

Variation 1

Figure 15:
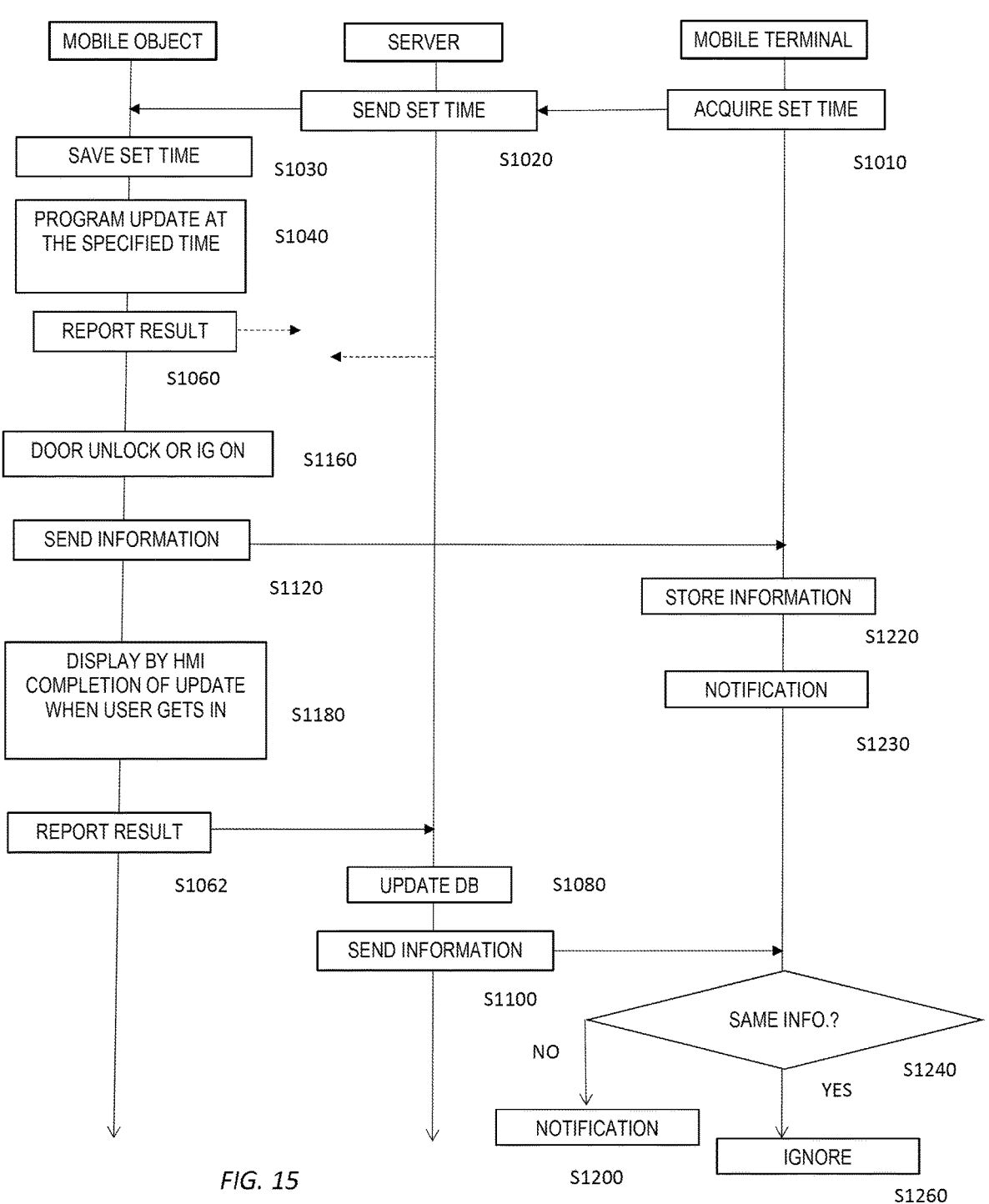
FIG. 15 shows a processing of a program update method of a mobile object according to another embodiment of the present application.

Next, a variation of the first embodiment of the present application is described. FIG. 15 shows a processing of a program update method of a mobile object according to another embodiment of the present application. Hereinafter, like elements are described by using like reference numerals and repetitive description of like elements employed in one or more embodiments described herein is omitted. In the first embodiment, after step S1220, the update communication control unit 312 does not perform notification before the determination step S1240. In the present embodiment, the update communication control unit 312 performs notification at step S1230. For example, the update communication control unit 312 displays on the display device 332, the result of program update screen 402.

In a case when the vehicle 20 is a Battery Electric Vehicle (BEV) or a Plug-in Hybrid Electric Vehicle (PHEV), a user approaches the vehicle 20 to start charging or to plug out a charger after finishing battery charging. The mobile terminal 30 carried by the user may be paired to the vehicle 20 via short range communication. In such a situation, the vehicle 20 may send information regarding update of the program to the mobile terminal 30, and the mobile terminal 30 may performs notification before the user enters the vehicle 20. Thus, it is possible to prevent repetitive notification with substantial delay by the mobile terminal 30.

Variation 2

Figure 16:
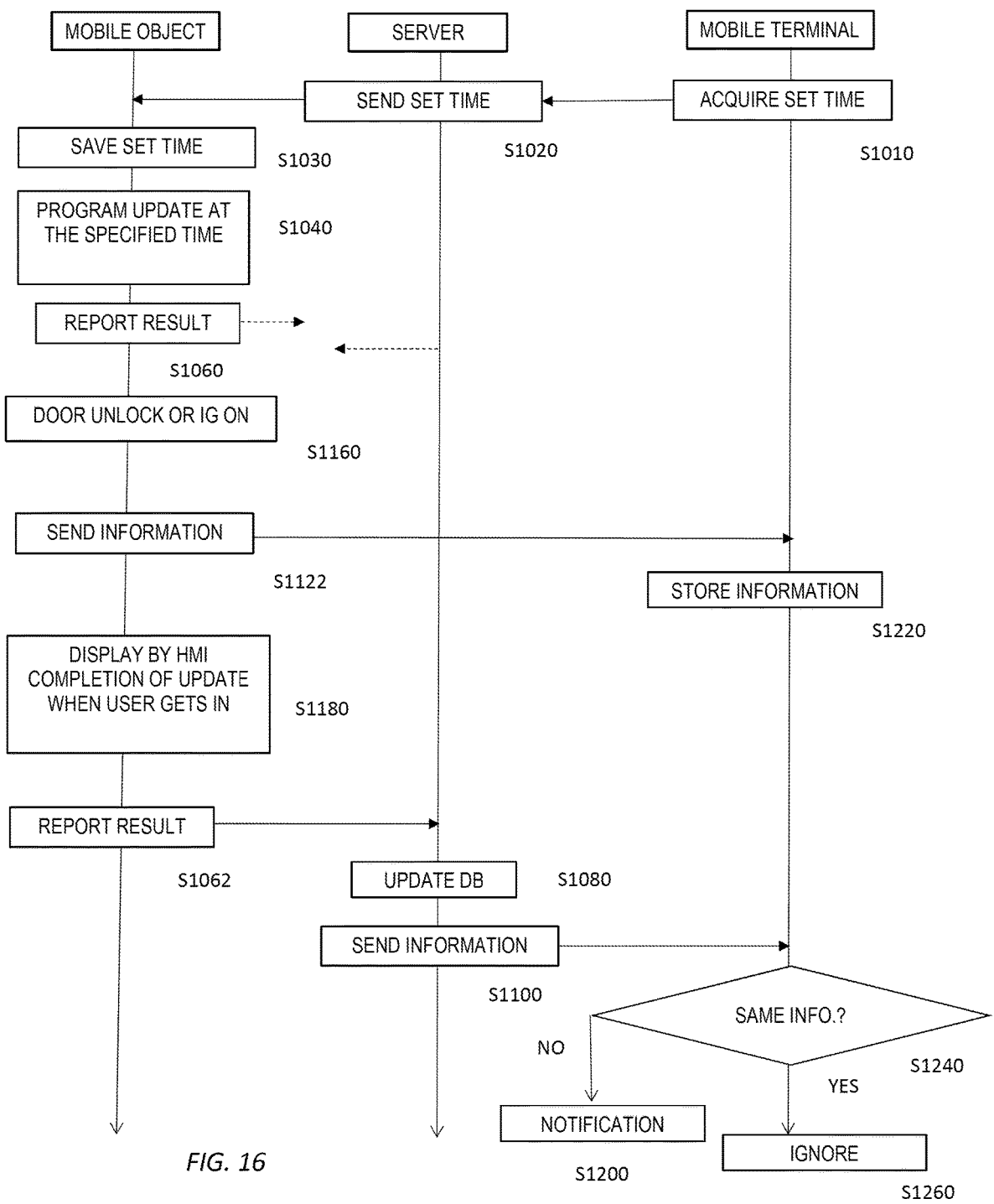
FIG. 16 shows a processing of a program update method of a mobile object according to another embodiment of the present application.
Figure 17:
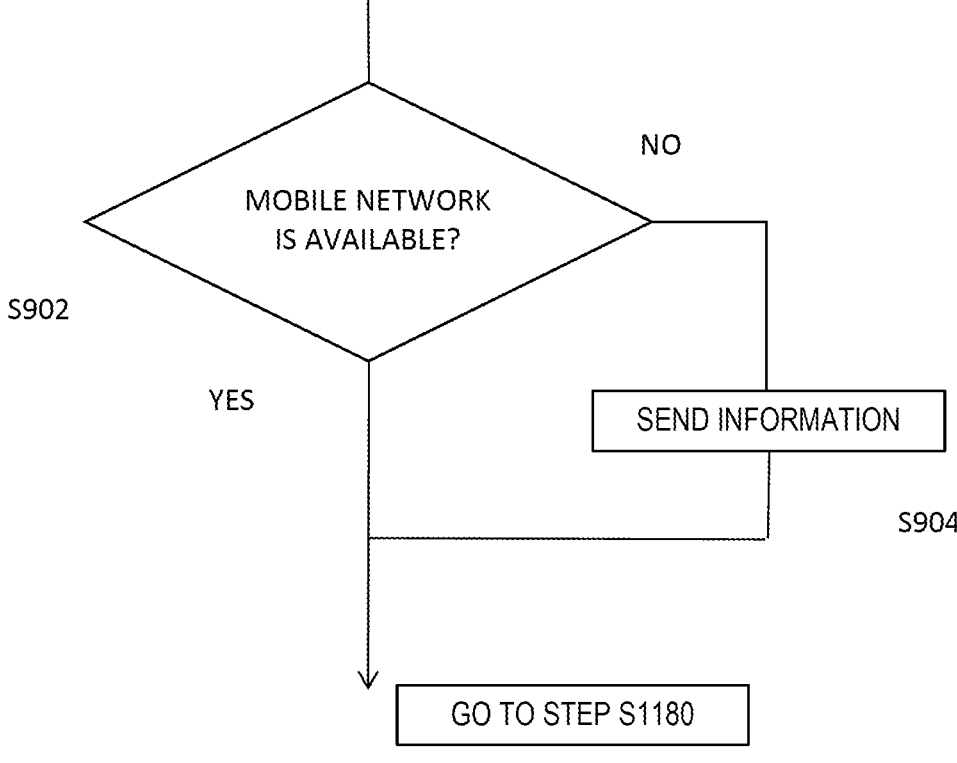
FIG. 17 shows a processing of a program update method performed by step S1122.

Next, another variation of the first embodiment of the present application is described. FIG. 16 shows a processing of a program update method of a mobile object according to another embodiment of the present application. In the present embodiment, the step S1120 is replaced with step S1122. FIG. 17 shows a processing of a program update method performed by step S1122. As shown by FIG. 17, the rewriting control unit 220 determines whether the mobile communication network is available or not at step S902. When the mobile communication network is not available, the rewriting control unit 220 enables to send information regarding update of the program to the mobile terminal 30 by using the SCU 203 at step S904. When the mobile communication network is available, the rewriting control unit 220 does not send information regarding update of the program to the mobile terminal 30 by using the SCU 203.

Determination of the availability of the mobile communication network may be done by using the flag "REPORT 1." When the flag "REPORT 1" contains the value "1," the vehicle 20 has received acknowledgement from the server 10. This indicates that the mobile communication network is available and the server 10 has already sent information regarding update of the program to the mobile terminal 30.

By this structure, in a situation when the server 10 has already sent information regarding update of the program to the mobile terminal 30, the rewriting control unit 220 is prevented from sending repetitive information regarding the update of the program to the mobile terminal 30 by using the SCU 203. Thus, it is possible to prevent repetitive notification with substantial delay by the mobile terminal 30.

Second Embodiment

Figure 18:
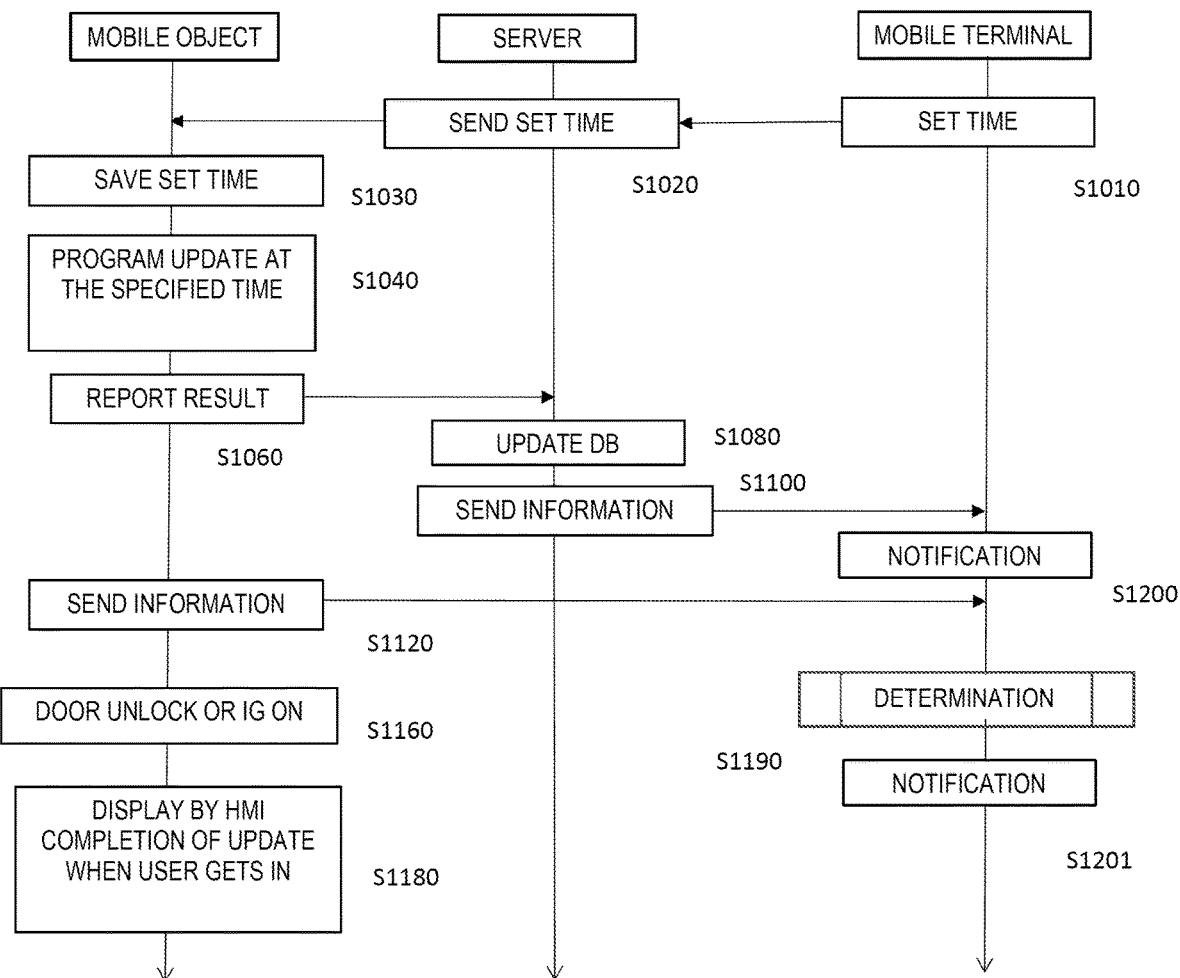
FIG. 18 shows a processing of a program update method of a mobile object according to second embodiment of the present application.
Figure 19:
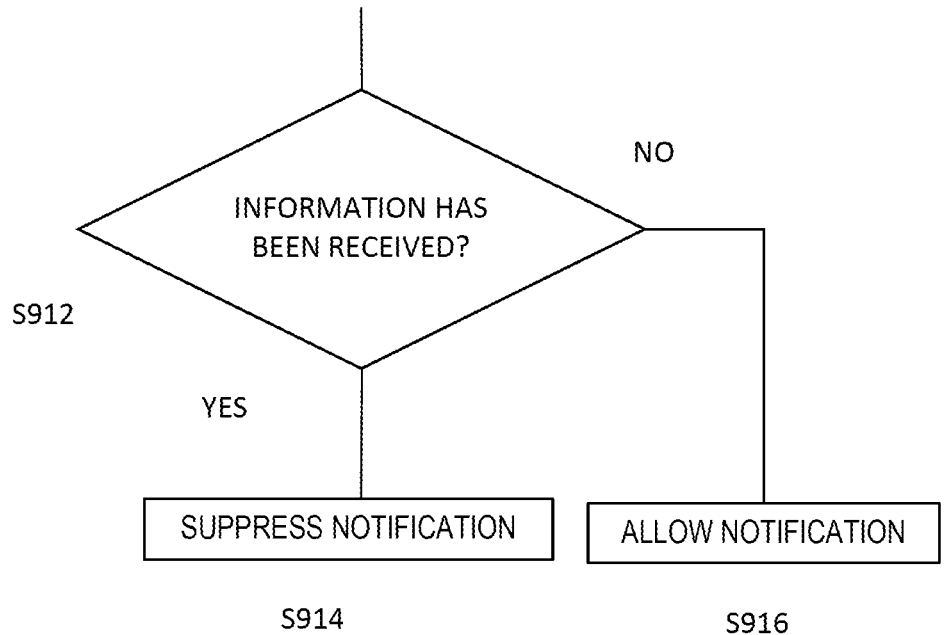
FIG. 19 shows a processing of the step S1190.

FIG. 18 shows a processing of a program update method of a mobile object according to second embodiment of the present application. Different from the above-described one embodiment, the second embodiment has additional notification step S1200 by the mobile terminal 30 after the step S1100. Also, the mobile terminal 30 has determination step S1190. FIG. 19 shows a processing of the step S1190. As shown by FIG. 19, upon receiving the information from the vehicle 20, the update communication control unit 312 determines whether the mobile device 30 has received the information from the server 10 at step S912. When it is determined that the mobile device 30 has received the information from the server 10, the update communication control unit 312 suppresses the notification by the mobile terminal 30 based on the received information from the vehicle 20 at step S914. On the other hand, when it is determined that the mobile device 30 has not received the information from the server 10, the update communication control unit 312 allows the notification by the mobile terminal 30 at step S916. Then, the process flow moves to the step S1201 and performs notification according to the determination by the step S1190.

The information from the vehicle 20 and the information from the server 10 respectively include the program update ID. Thus, checking and comparing the program update ID, it is possible to determine whether the mobile device 30 has received the subject information from the server 10.

In a case when the mobile device 30 has received the subject information from the server 10, the mobile device 30 would have already performed notification. Thus, by suppressing another notification by the mobile terminal 30, repetitive notification with substantial delay time may be prevented.

Third Embodiment

Figure 20:
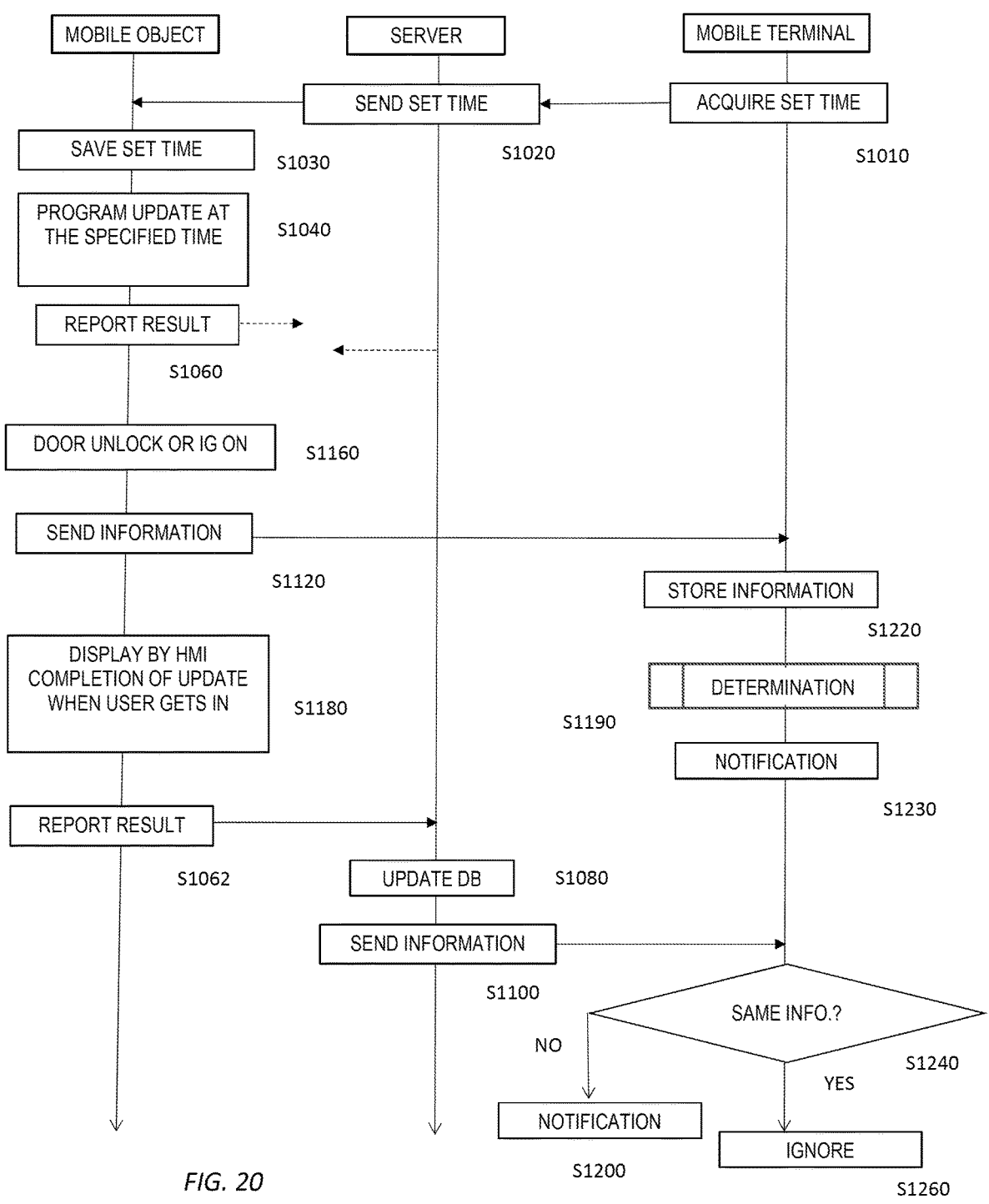
FIG. 20 shows a processing of a program update method of a mobile object according to third embodiment of the present application.

FIG. 20 shows a processing of a program update method of a mobile object according to third embodiment of the present application. Different from the above variation 1 of the first embodiment, the third embodiment has determination step S1190 before the notification step S1230. As shown by FIG. 19, after storing the information from the vehicle 20 at step S1220, the update communication control unit 312 determines whether the mobile device 30 has received the information from the server 10 at step S912. When it is determined that the mobile device 30 has received the information from the server 10, the update communication control unit 312 suppresses the notification by the mobile terminal 30 based on the received information from the vehicle 20 at step S914. On the other hand, when it is determined that the mobile device 30 has not received the information from the server 10, the update communication control unit 312 allows the notification by the mobile terminal 30 at step S916. Then, the process flow moves to the step S1230 and performs notification according to the determination by the step S1190.

The information from the vehicle 20 and the information from the server 10 respectively include the program update ID. Thus, checking the program update ID, it is possible to determine whether the mobile device 30 has received the subject information from the server 10.

In a case when the mobile device 30 has received the subject information from the server 10, the mobile device 30 would have already performed notification. Thus, by suppressing another notification by the mobile terminal 30, repetitive notification with substantial delay time may be prevented.

Fourth Embodiment

Figure 21:
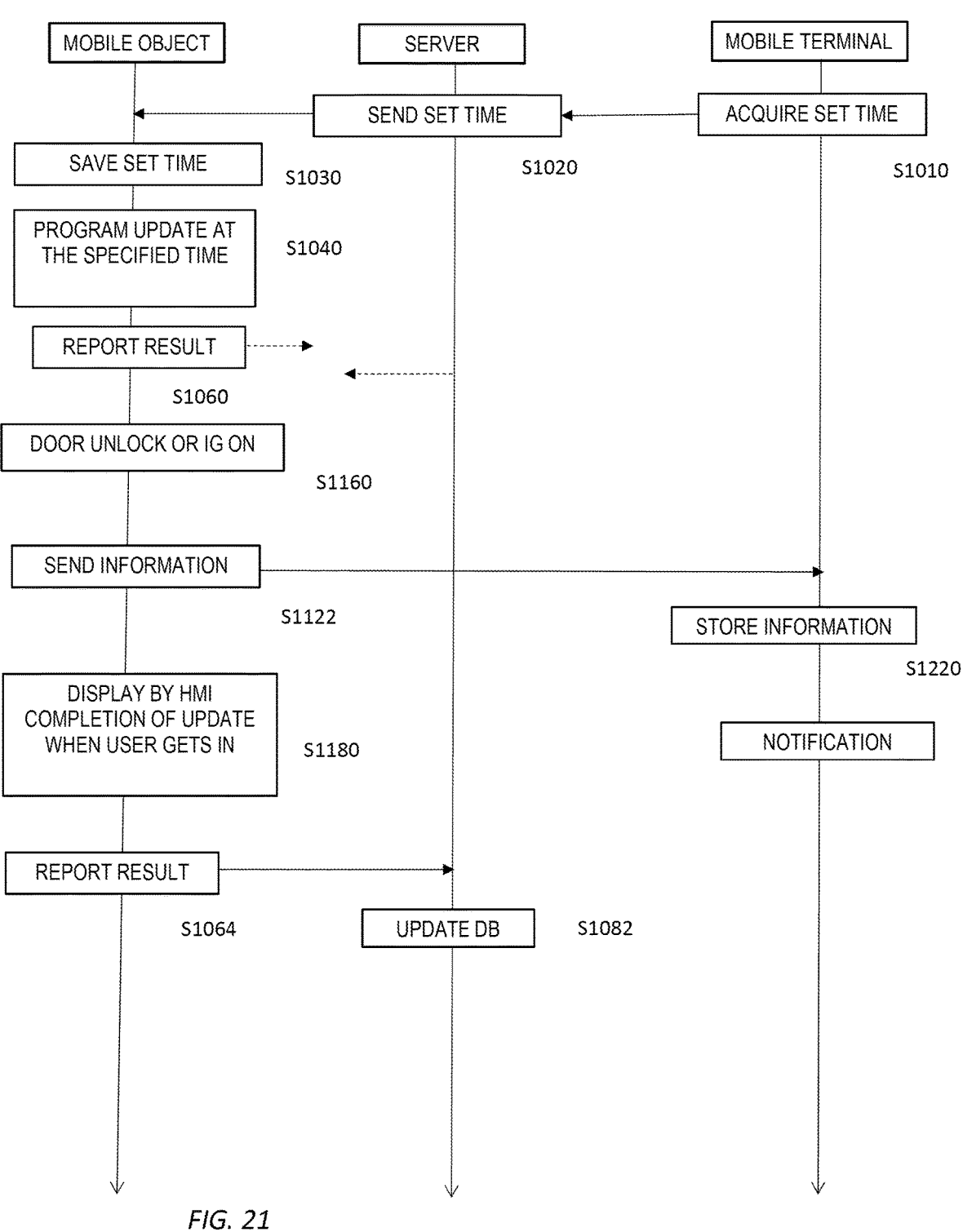
FIG. 21 shows a processing of a program update method of a mobile object according to fourth embodiment of the present application.

FIG. 21 shows a processing of a program update method of a mobile object according to fourth embodiment of the present application. Different from the above-described variation 2 of the first embodiment, the fourth embodiment has notification step S1230 after storing step S1220. Also, the step S1062 is replaced with step S1064, and the step S1080 is replaced with step S1082.

At step S1064, the rewriting control unit 220 check the flag REPORT 2." As described above, at step 1122, the rewriting control unit 220 updates the flag "REPORT 2" from zero to one to indicate that the information has been received by the mobile terminal 30. Thus, at step S1064, when the flag "REPORT 2" has a value of one, the information has been received by the mobile terminal 30.

Figure 22:
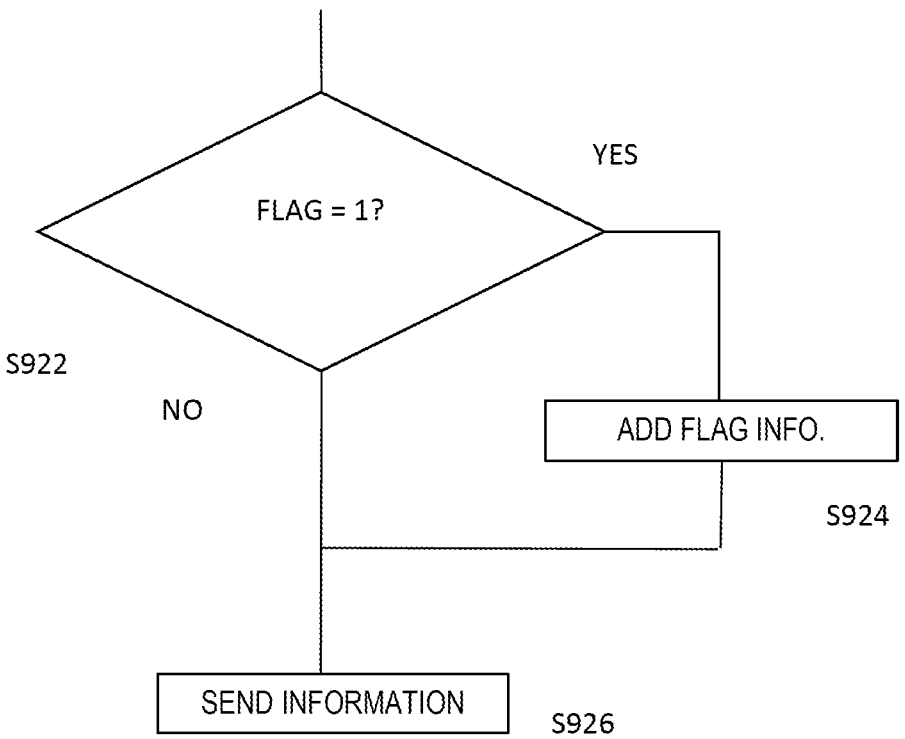
FIG. 22 shows a processing of the step S1064.

FIG. 22 shows a processing of the step S1064. As shown by FIG. 22, the rewriting control unit 220 check the value of the flag "REPORT 2" at step S922. When the value is one, the rewriting control unit 220 adds flag information that indicates that the information has been received by the mobile terminal 30 at step S924. Then, the rewriting control unit 220 sends the information regarding update of the program to the server 10 with the flag information at step S926.

Figure 23:
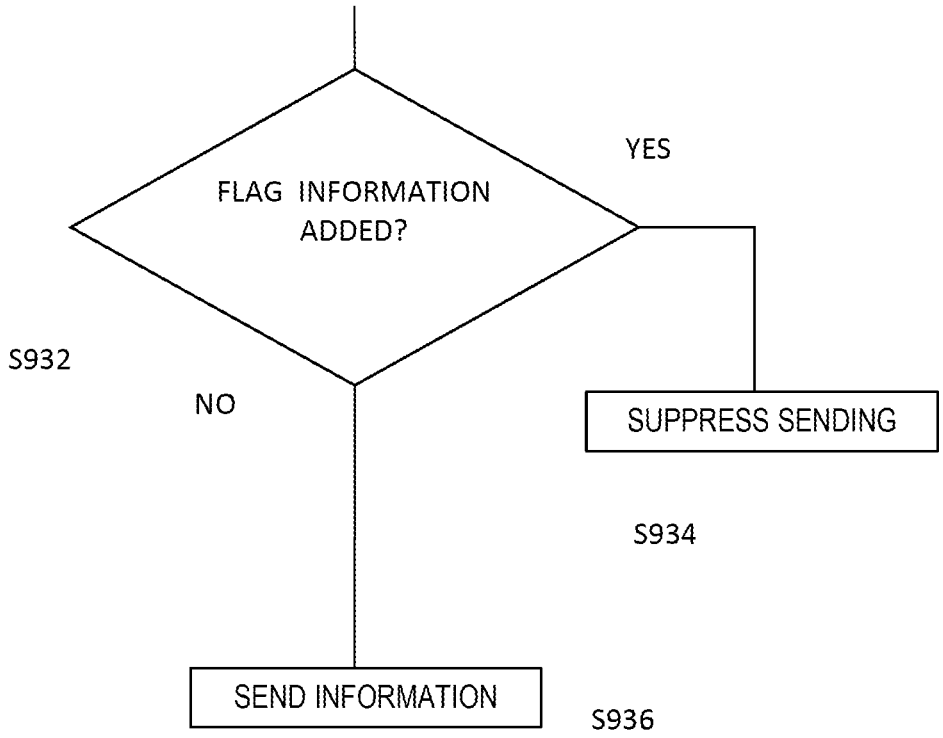
FIG. 23 shows a processing of the step S1082.

At step S1082, the program update control unit 112 receives the information from the vehicle 20 and update the table in the server 10. FIG. 23 shows a processing of the step S1082. As shown by FIG. 23, the program update control unit 112 determines whether the received information has the flag information added thereto at step S932. When it is determined that the flag information is added, the program update control unit 112 updates the table of the server 10 (REPORT 2 be updated to "1") and suppresses sending information regarding update of the program to the mobile terminal 30 at step S934. When it is determined that the flag information is not added, the program update control unit 112 sends information regarding update of the program to the mobile terminal 30 at step S936.

By this structure, it is possible to suppress to send repetitive information to the mobile terminal 30 through the server 10 after the information has been sent to the mobile terminal from the vehicle 20 via the short range communication. Thus, it is possible to prevent repetitive notification with substantial delay time by the mobile terminal 30.

Fifth Embodiment

Figure 24:
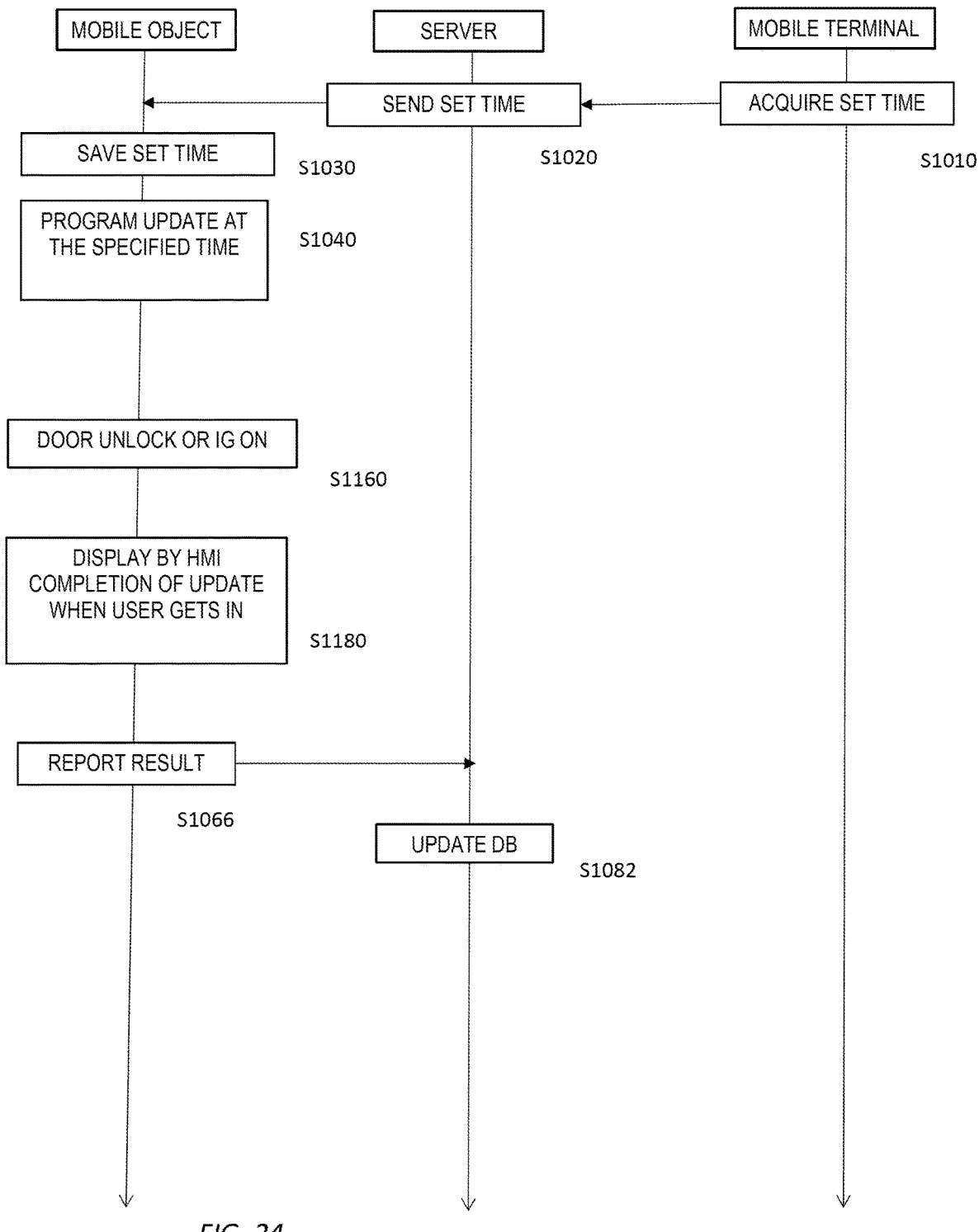
FIG. 24 shows a processing of a program update method of a mobile object according to fifth embodiment of the present application.

FIG. 24 shows a processing of a program update method of a mobile object according to fifth embodiment of the present application. The fifth embodiment is directed to a situation in which the communication network such as a mobile communication network is not available because the vehicle 20 is parked in an underground garage and a user of the vehicle 20 unlocks the door right after finishing the program update, or the user is present in the vehicle 20.

Figure 25:
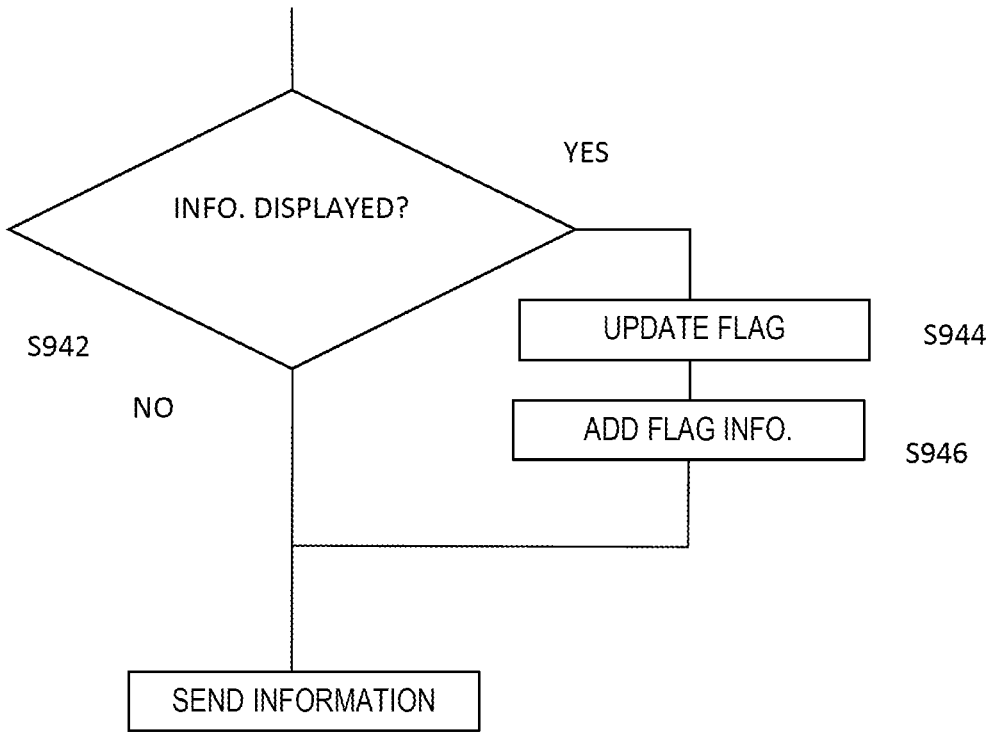
FIG. 25 shows a processing of the step S1066.

FIG. 25 shows a processing of the step S1066. As shown by FIG. 25, the rewriting control unit 220 determines whether notification has been performed by the IVI 299 and/or MID 298 at step S942. When it is determined that notification has been performed by the IVI 299 and/or MID 298, the rewriting control unit 220 suppresses notification by the mobile terminal 30. For example, the rewriting control unit 220 updates the value of the flag "REPORT 2" to one at step S944. Then, sending the information regarding update of the program via the short range communication from the vehicle 20 is suppressed. Also, the rewriting control unit 220 adds flag information that indicates that the information has been received by the mobile terminal 30 at step S946. Then, the rewriting control unit 220 sends the information regarding update of the program to the server 10 with the flag information.

At step S1082, the program update control unit 112 receives the information from the vehicle 20 and update the table in the server 10. When it is determined that the flag information is added, the program update control unit 112 updates the table of the server 10 (REPORT 2 be updated to "1") and suppresses sending information regarding update of the program to the mobile terminal 30. When it is determined that the flag information is not added, the program update control unit 112 sends information regarding update of the program to the mobile terminal 30.

By this structure, it is possible to suppress to send repetitive information to the mobile terminal 30 through the server 10 or directly send from the vehicle 20 via the short range communication after the information has been notified to the user by display device equipped with the vehicle 20. Thus, it is possible to prevent repetitive notification with substantial delay time by the mobile terminal 30.

Figure 26:
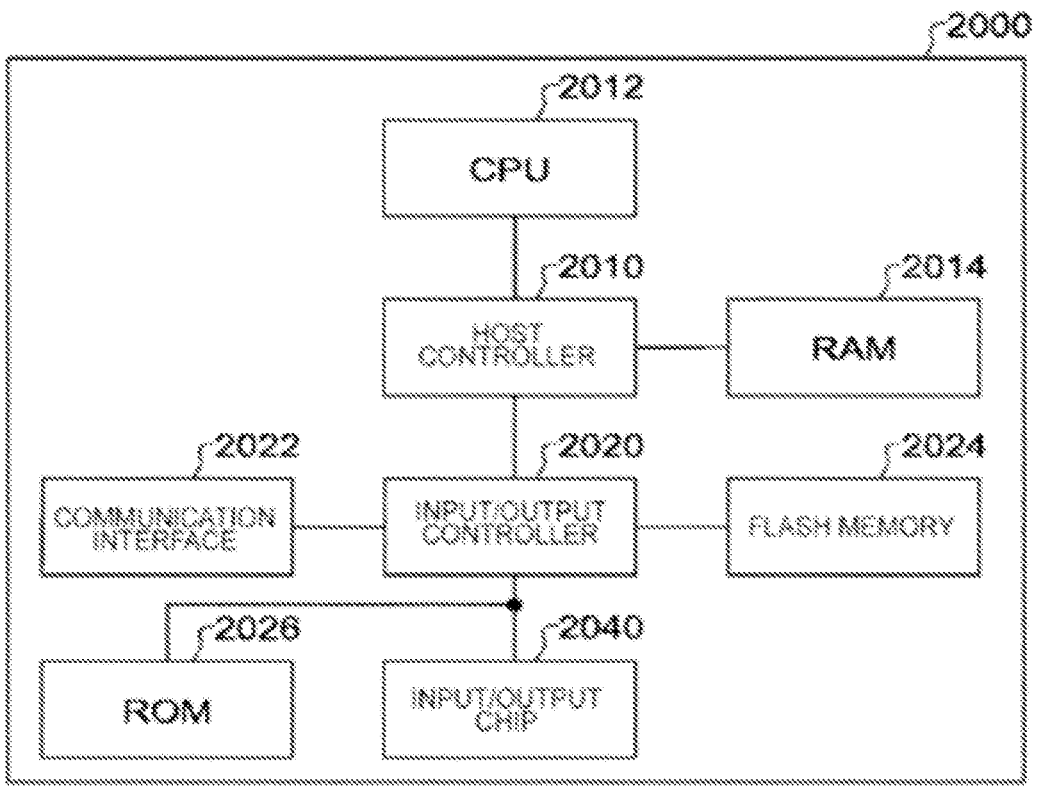
FIG. 26 shows an example of a computer 2000 where a plurality of embodiments of the present disclosure may be entirely or partially embodied.

FIG. 26 shows an example of a computer 2000 where a plurality of embodiments of the present disclosure may be entirely or partially embodied. A program that is installed in the computer 2000 can cause the computer 2000 to function as a system such as the control system of the embodiment or each unit of the system or as an apparatus such as an information processing apparatus or each unit of the apparatus, to execute operations associated with the system or each unit of the system or the apparatus or each unit of the apparatus, and/or to execute the process of the embodiment or steps thereof. Such a program may be executed by a CPU 2012 so as to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 is configured to operate according to programs stored in the ROM 2026 and the RAM 2014, thereby controlling each unit.

The communication interface 2022 is configured to communicate with other electronic devices via a network. The flash memory 2024 is configured to store a program and data that are used by the CPU 2012 in the computer 2000. The ROM 2026 is configured to store a boot program or the like that is executed by the computer 2000 at boot-up, and/or a program depending on hardware of the computer 2000. The input and output chip 2040 may also be configured to connect various input and output units such as a keyboard, a mouse, and a monitor, to the input and output controller 2020 via input and output ports such as a serial port, a parallel port, a keyboard port, a mouse port, a monitor port, a universal serial bus (USB) port and a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and is executed by the CPU 2012. Information processing described in these programs is read into the computer 2000, resulting in cooperation between the programs and the various types of hardware resources described above. An apparatus or a method may be constituted by realizing an operation or processing of information according to a use of the computer 2000.

For example, when communication is performed between the computer 2000 and an external device, the CPU 2012 may be configured to execute a communication program loaded onto the RAM 2014 to instruct communication processing to the communication interface 2022, based on processing described in the communication program. The communication interface 2022 is configured, under control of the CPU 2012, to read transmission data stored on a transmission buffer processing area provided in a recording medium such as the RAM 2014 and the flash memory 2024, to transmit the read transmission data to the network, and to write reception data received from the network to a reception buffer processing area or the like provided on the recording medium.

In addition, the CPU 2012 may be configured to cause all or a necessary portion of a file or a database, which has been stored in a recording medium such as the flash memory 2024, to be read into the RAM 2014, thereby executing various types of processing on the data on the RAM 2014. Next, the CPU 2012 is configured to write the processed data back to the recording medium.

Various types of information, such as various types of programs, data, tables, and databases, may be stored in the recording medium and may be subjected to information processing. The CPU 2012 may be configured to execute, on the data read from the RAM 2014, various types of processing including various types of operations, processing of information, conditional judgment, conditional branching, unconditional branching, search and replacement of information, and the like described in the present specification and specified by instruction sequences of the programs, and to write a result back to the RAM 2014. The CPU 2012 may also be configured to search for information in a file, a database, etc., in the recording medium. For example, when a plurality of entries, each having an attribute value of a first attribute associated with an attribute value of a second attribute, is stored in the recording medium, the CPU 2012 may be configured to search for an entry having a designated attribute value of the first attribute that matches a condition from the plurality of entries, and to read the attribute value of the second attribute stored in the entry, thereby obtaining the attribute value of the second attribute associated with the first attribute that satisfies a predetermined condition.

The programs or software modules described above may be stored in a computer-readable storage medium on or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program that is installed in the computer 2000 and causes the computer 2000 to function as the control system 200 may work on the CPU 2012 and the like to cause the computer 2000 to function as each unit of the control system 200, respectively.

Information processing described in these programs are read into the computer 2000 to cause the computer to function as each unit of the control system 200, which is a specific means realized by cooperation of software and the various types of hardware resources described above. Then, with these specific means, by realizing computing or processing of information according to an intended use of the computer 2000 in the present embodiment, the specific control system 200 is constructed according to the intended use.

Similarly, a program that is installed in the computer 2000 and causes the computer 2000 to function as the control system 100 may work on the CPU 2012 and the like to cause the computer 2000 to function as each unit of the control system 100, respectively. Information processing described in these programs are read into the computer 2000 to cause the computer to function as each unit of the control system 100, which is a specific means realized by cooperation of software and the various types of hardware resources described above. Then, with these specific means, by realizing computing or processing of information according to an intended use of the computer 2000 in the present embodiment, the specific control system 100 is constructed according to the intended use.

Similarly, a program that is installed in the computer 2000 and causes the computer 2000 to function as the control system 300 may work on the CPU 2012 and the like to cause the computer 2000 to function as each unit of the control system 300, respectively. Information processing described in these programs are read into the computer 2000 to cause the computer to function as each unit of the control system 300, which is a specific means realized by cooperation of software and the various types of hardware resources described above. Then, with these specific means, by realizing computing or processing of information according to an intended use of the computer 2000 in the present embodiment, the specific control system 300 is constructed according to the intended use.

Various embodiments have been described with reference to the block diagrams and the like. In the block diagrams, each block may represent (1) a step of a process in which an operation is executed, or (2) each unit of an apparatus having a role in executing the operation. Certain steps and each unit may be implemented by dedicated circuitry, programmable circuitry supplied with computer-readable instructions stored on computer-readable storage media, and/or processors supplied with computer-readable instructions stored on computer-readable storage media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions to be executed by a suitable device, and as a result, the computer-readable storage medium having the instructions stored thereon constitutes at least a part of an article of manufacture including instructions that can be executed to provide means for performing operations specified in the processing procedures or block diagrams. Examples of the computer-readable storage media may include an electronic storage medium, a magnetic storage medium, an optical storage medium, an electromagnetic storage medium, a semiconductor storage medium, and the like. More specific examples of the computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as a 'C' programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to provide means for performing operations specified in the described processing procedures or block diagrams. Examples of processors include computer processors, processing units, microprocessors, digital signal processors, controllers, microcontrollers, and the like.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications. In the accompanying claims, a processor is not limited to a single processor, a processor may be implemented by one or more processor. Also, multiple processes or functions may be implemented by a single processor.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A program update method of a mobile object by acquiring a new program from a server device via a network, the method comprising:
   (i) performing update of a program of an electronic control unit equipped with the mobile object while the mobile object is stationary by using the new program acquired from the server device;
   (ii) sending, from the mobile object to a mobile terminal via a mobile communication network, a first information regarding update of the program of the electronic control unit while the vehicle is stationary;
   (iii) sending, by using a short range communication from the mobile object to the mobile terminal, a second information regarding update of the program of the electronic control unit to the mobile terminal while the mobile object is stationary; and (iv) notifying to a user of a finish of the program update before movement of the mobile object is started by at least one of the mobile terminal or a notification device equipped with the mobile object, wherein the notification to the user by the mobile terminal is not made at least during the movement of the mobile object.

2. The program update method of the mobile object according to claim 1, wherein the notification to the user is performed by the notification device equipped with the mobile object, and the method further comprises:

storing the second information by the mobile terminal;

after the step (iii), when the mobile communication network is available, sending, from the mobile object to the mobile terminal via the mobile communication network, the first information;

comparing by the mobile terminal the stored second information with the received first information, and when it is determined that the stored second information and the received first information are regarding the same update of the program of the electronic control unit, ignoring by the mobile terminal the received first information.

3. The program update method of the mobile object according to claim 1, wherein the step (iii) further comprises determining whether the mobile communication network is available to send the first information, and when it is determined that the mobile communication network is not available, sending, by using the short range communication from the mobile object to the mobile terminal, the second information to the mobile terminal.

4. The program update method of the mobile object according to claim 1, wherein the step (iv) performs the notification of the completion of the program by the mobile terminal to the user, based on the received first information without using the second information, or based on the received second information without using the first information.

5. The program update method of the mobile object according to claim 4, further comprising:

upon receiving the second information, determining whether the mobile device has received the first information, when it is determined that the mobile device has received the first information, suppressing the notification by the mobile terminal based on the received second information, and when it is determined that the mobile device has not received the first information, performing the notification by the mobile terminal based on the received second information.

6. The program update method of the mobile object according to claim 1, wherein the step (iii) further comprises determining whether the mobile communication network is available to send the first information, and when it is determined that the mobile communication network is not available, sending, by using the short range communication from the mobile object to the mobile terminal, the second information to the mobile terminal, wherein the method further comprises:

after the step (iii), when the mobile communication network is available, updating the server device by informing that the second information has been sent to the mobile terminal.

7. The program update method of the mobile object according to claim 1, further comprising:

determining whether the notification is performed by the notification device equipped with the mobile object, and when it is determined that the notification is performed by the notification device equipped with the mobile object, it is disabled to send by using the short range communication from the mobile object to the mobile terminal the second information, or it is disabled to send the first information to the mobile terminal.

8. The program update method of the mobile object according to claim 1, wherein the first information and the second information includes one or more of a result including success or failure of the update, a version information of the updated program, or a detail of the update.

9. The program update method of the mobile object according to claim 1, further comprising:

setting up a timer for execution of the update of the program of the electronic control unit equipped with the mobile object; and performing the update of the program of the electronic control unit by the mobile object according to the set-up timer.

10. The program update method of the mobile object according to claim 1, further comprising:

determining whether a door of the mobile object has been unlocked, and when it is determined that the door of the mobile object has been unlocked, connecting the mobile object to the mobile terminal by using the short range communication to send the second information.

11. The program update method of the mobile object according to claim 1, wherein the first information and the second information are identical.

12. A program update system comprising:

a server device;

a mobile object; and a mobile terminal, wherein the mobile object comprises:

an acquisition unit acquiring a new program from the server deice via a network, and a rewriting control unit performing a rewriting control of rewriting a program of an electronic control unit equipped with the mobile object, the rewriting being performed by using the acquired new program during drive of the mobile object is disabled, the rewriting control unit sending, from the mobile object to the mobile terminal via a mobile communication network, a first information regarding update of the program of the electronic control unit while the vehicle is stationary, the rewriting control unit sending, by using a short range communication from the mobile object to the mobile terminal, a second information regarding update of the program of the electronic control unit to the mobile terminal while the mobile object is stationary, and wherein the mobile terminal comprises a notification processor notifying to a user of a finish of the program-update before movement of the mobile object is started, the notification to the user by the mobile terminal is not made at least during the movement of the mobile object, wherein the mobile object comprises a notification device notifying to the user of the finish of the program update before movement of the mobile object is started, and wherein the program update system performs the notification by either the mobile terminal or the notification device.

13. The program update system according to claim 12, wherein the notification to the user is performed by the notification device equipped with the mobile object, the notification processor of the mobile terminal stores the second; after sending the second information, when the mobile communication network is available, the rewriting control unit sends to the mobile terminal via the mobile communication network, the first information; the notification processor of the mobile terminal compares the stored second information with the received first information, and when it is determined that the stored second information and the received first information are regarding the same update of the program of the electronic control unit, the notification processor ignores the received first information.

14. The program update system according to claim 12, wherein the rewriting control unit determines whether the mobile communication network is available to send the first information, and when it is determined that the mobile communication network is not available, sends, by using the short range communication from the mobile object to the mobile terminal, the second information to the mobile terminal.

15. The program update system according to claim 12, wherein the notification processor of the mobile terminal performs the notification of the completion of the program by the mobile terminal to the user, based on the received first information without using the second information, or based on the received second information without using the first information.

16. The program update system according to claim 15, wherein upon receiving the second information, the notification processor of the mobile terminal determines whether the mobile device has received the first information, when it is determined that the mobile device has received the first information, the notification processor of the mobile terminal suppresses the notification by the mobile terminal based on the received second information, and when it is determined that the mobile device has not received the first information, the notification processor of the mobile terminal performs the notification by the mobile terminal based on the received second information.

17. A mobile object comprising:

an acquisition unit acquiring a new program from a server deice via a network; and a rewriting control unit performing a rewriting control of rewriting a program of an electronic control unit equipped with the mobile object, the rewriting being performed by using the acquired new program during drive of the mobile object is disabled, the rewriting control unit sending, from the mobile object to the mobile terminal via a mobile communication network, a first information regarding update of the program of the electronic control unit while the vehicle is stationary, the rewriting control unit sending, by using a short range communication from the mobile object to the mobile terminal, a second information regarding update of the program of the electronic control unit to the mobile terminal while the mobile object is stationary, and wherein the mobile object comprises a notification device notifying to a user of a finish of update of the program before movement of the mobile object is started, and wherein the mobile object performs the notification by the notification device, or causes the mobile terminal to notify to the user of the finish of update of the program before movement of the mobile object is started, the notification to the user by the mobile terminal is not made at least during the movement of the mobile object.

18. The mobile object according to claim 17, the rewriting control unit determines whether the mobile communication network is available to send the first information, and when it is determined that the mobile communication network is not available, sends, by using the short range communication from the mobile object to the mobile terminal, the second information to the mobile terminal.

19. The mobile object according to claim 17, wherein the rewriting control unit determines whether the mobile communication network is available to send the first information, and when it is determined that the mobile communication network is not available, the rewriting control unit sends, by using the short range communication from the mobile object to the mobile terminal, the second information to the mobile terminal, after sending the second information, when the mobile communication network is available, the rewriting control unit updates the server device by informing that the second information has been sent to the mobile terminal.

20. The mobile object according to claim 17, wherein the rewriting control unit determines whether the notification is performed by the notification device equipped with the mobile object, and when it is determined that the notification is performed by the notification device equipped with the mobile object, it is disabled to send by using the short range communication from the mobile object to the mobile terminal the second information, or it is disabled to send the first information to the mobile terminal.

* * * * *